(12) United States Patent
Cornford

(10) Patent No.: US 8,301,490 B2
(45) Date of Patent: Oct. 30, 2012

(54) METHODS AND SYSTEMS FOR OPTIMIZATION OF INNOVATIVE CAPACITY AND ECONOMIC VALUE FROM KNOWLEDGE, HUMAN AND RISK CAPITAL ASSET SETS

(76) Inventor: Alan B. Cornford, Bowen Island (CA)

(*) Notice: Subject to any disclaimer, the term of this patent is extended or adjusted under 35 U.S.C. 154(b) by 997 days.

(21) Appl. No.: 11/676,305

(22) Filed: Feb. 18, 2007

(65) Prior Publication Data

US 2007/0208599 A1    Sep. 6, 2007

Related U.S. Application Data

(60) Provisional application No. 60/774,597, filed on Feb. 21, 2006.

(51) Int. Cl.
*G06F 10/00* (2006.01)
(52) U.S. Cl. ..................................... 705/7.39
(58) Field of Classification Search ............. 705/7, 7.39
See application file for complete search history.

(56) References Cited

U.S. PATENT DOCUMENTS

| | | | |
|---|---|---|---|
| 6,556,974 B1 * | 4/2003 | D'Alessandro | 705/10 |
| 7,269,569 B2 * | 9/2007 | Spira et al. | 705/7 |
| 7,349,877 B2 * | 3/2008 | Ballow et al. | 705/36 R |

OTHER PUBLICATIONS

Al-Hawari et al "Evaluating the knowledge Asset of Innovative Companies", Sep. 2002, Ajis, vol. 10, No. 1, pp. 1-11.*

* cited by examiner

*Primary Examiner* — Romain Jeanty

(57) ABSTRACT

Methods and systems for optimizing innovative capacity and new economic value from aggregates of public and private national, state, provincial and industry sector assets are disclosed. Sets of policy adjustment operations are performed to existing levels of the assets to attain desired benchmark settings based on optimal values and relationships for innovative capacity drivers derived from models and observations of economic performance data. The rate of change and the amount of increase in innovative capacity and economic value is monitored over time in relation to the extent of attainment of the desired benchmark values.

10 Claims, 33 Drawing Sheets

Fig. 7A

Benchmarks and Empirical Relationships

Benchmark 1: R&D either funded or performed by the private sector/R&D both funded and performed by the public sector ≥ 3/1;

Benchmark 2: $R&D both funded and performed by the public sector/dollars spent on private and public dissemination of the results of public R&D = 20/1;

Benchmark 3: R&D either funded or performed by the private sector/HQP researchers = 3/2;

Benchmark 4: HQP (highly qualified people) (mainly research scientists and engineers)/total workforce >10/1000;

Benchmark 5: Innovative capacity = HQP per 1000 work persons x (private/public R&D)$^2$ = (ratio #3) x (ratio #1)$^2$ = 90;

Empirical relation 1: Product opportunities = $(million) public R&D/22.5 = $(million) private R&D/1.5; Total product opportunities/ $(million) for benchmark 1 = 0.51;

Empirical relation 2: The total number of venture capital investments/ number of 'disruptive' product opportunities = 1/K (where K is observed to be in the order of 4 from preliminary North American data)

Fig. 7B

| | Stage 1<br>Column 1 | Stage 2<br>Column 2 | Stage 3<br>Column 3 | Stage 4<br>Column 4 | Column 5 | Column 6 | Stage 5<br>Column 7 | Stage 6<br>Column 8 | Stage 7<br>Column 9 | Stage 8<br>Column 10 | Column 11 | Column 12 |
|---|---|---|---|---|---|---|---|---|---|---|---|---|
| | Public R&D Performed ($ million) | Private R&D Performed ($million) | Private/ Public R&D ratio | Product Opportunities (AUTM model) | Product opportunities (/$millionR&D) | HQP/10,000 workforce (Sci + Eng.) | <$500K Pre-Seed investment | $0.5-1M Seed investment | $1-5M Growth investment | >$5M Expansion investment | Total venture capital investment | Innovative Capacity Index |
| | | | 3 | | 0.51 | 10 | | | | | | 90 |
| Benchmark | | | | | | | | | | | | |
| Finland | | | | | | | | | | | | |
| 1997/98 | $1,005 | $1,949 | 1.94 | 1,344 | 0.45 | 12.3 | | | | | | 46.3 |
| 2002/03 | $1,352 | $3,325 | 2.46 | 2,277 | 0.49 | 15.8 | | | | | | 95.6 |
| | 35% | 71% | 27% | 69% | 7% | 28% | | | | | | 107% |
| USA/10 | | | | | | | | | | | | |
| 1997/98 | $5,580 | $15,750 | 2.82 | 10,748 | 0.5 | 8.2 | $53 | $88 | $299 | $1,320 | $1,760 | 65.3 |
| 2002/03 | $7,900 | $21,310 | 2.7 | 14,558 | 0.5 | 9 | $51 | $85 | $288 | $1,270 | $1,693 | 65.5 |
| | 42% | 35% | -4% | 35% | 0% | 10% | -4% | -4% | -4% | -4% | -4% | 0% |
| Canada | | | | | | | | | | | | |
| 1997/98 | $5,895 | $8,744 | 1.48 | 6,091 | 0.42 | 5.4 | $82 | $97 | $626 | $753 | $1,558 | 11.9 |
| 2002/03 | $9,500 | $11,244 | 1.18 | 7,918 | 0.38 | 6.4 | $35 | $51 | $406 | $1,120 | $1,612 | 9 |
| | 61% | 29% | -20% | 30% | -8% | 19% | -57% | -47% | -35% | 49% | 3% | -25% |
| British Columbia | | | | | | | | | | | | |
| 1997/98 | $474 | $564 | 1.19 | 397 | 0.38 | 5.2 | $82 | $5 | $10 | $66 | $121 | 7.4 |
| 2002/03 | $867 | $979 | 1.13 | 691 | 0.37 | 6.1 | $35 | $2 | $3 | $34 | $68 | 7.8 |
| | 83% | 74% | -5% | 74% | -2% | 17% | -57% | -60% | -70% | -48% | -44% | 6% |
| Alberta | | | | | | | | | | | | |
| 1997/98 | $503 | $547 | 1.09 | 387 | 0.37 | 5.9 | $2 | $3 | $32 | $45 | $83 | 7 |
| 2002/03 | $947 | $694 | 0.73 | 505 | 0.31 | 7 | $1 | $4 | $15 | $53 | $72 | 3.8 |
| | 88% | 27% | -33% | 30% | -17% | 19% | -58% | 31% | -54% | 16% | -13% | -46% |
| California | | | | | | | | | | | | |
| 2002/03 | $15,686 | $39,664 | 2.53 | 27140 | 0.49 | | | | | | $9,467 | |
| Massachussetts | | | | | | | | | | | | |
| 2002/03 | $4,659 | $10,279 | 2.21 | 7060 | 0.47 | | | | | | $2,363 | |
| Canada Energy Sector | | | | | | | | | | | | |
| 2002/03 | $298 | $694 | 2.33 | 476 | 0.48 | | | | | | $48 | |

Fig. 8B

| Policy Focus | Policy Type | Policy # | Example Policy Operation (National/Federal & Provincial) |
|---|---|---|---|
| Building Knowledge Capital | Framework | Policy 1 | • *Federal*: SR&ED (Scientific Research and Experimental Development) Tax Incentive for Private R&D (Research and Development)<br>• *Provincial*: Policies to optimize SR&ED |
| | Blanket | Policy 2 | • *Federal*: IRAP /SME (Industrial Research Assistance Program for Small and Medium Enterprises) private co-investment<br>• *Provincial*: Compliment IRAP (Industrial Research Assistance Program) for target clusters |
| | Focused | Policy 3A/3B | • *Federal*: Tax incentives for university / college R&D in public/ private R&D partnership<br>• *Provincial*: Tax incentives or matching funds for university/college R&D in sectors/clusters |
| Building Human Capital | Framework | Policy 4 | • *Federal*: HRD (Human Resource Development) skills placement services and improved immigration hiring tax credits<br>• *Provincial*: Immigration hiring tax credits and VC (Venture Capital) skills placement |
| | Blanket | Policy 5 | • *Federal*: Selected investment in skills and workforce programs in targeted clusters<br>• *Provincial*: Targeted first job investments in post secondary S&T (Science and Technology) & technology management |
| | Focused | Policy 6 | • *Federal*: Increased support for post secondary learning activities and for research scholarships<br>• *Provincial*: Tax incentives for S&T skills and technology management hiring by companies |
| Enabling Access to Risk Capital | Framework | Policy 7 | • *Federal*: Federal trade/promotion investments<br>• *Provincial*: Licensing/trade tax incentives |
| | Blanket | Policy 8 | • *Federal*: VCC (Venture Capital Corporation) tax credits for risk investment<br>• *Provincial*: VCC tax incentives based on provincial product opportunity yield |
| | Focused | Policy 9 | • *Federal*: First user risk reduction VCC tax credit<br>• *Provincial*: First user risk reduction loans/tax credits |

Fig. 9A

Policy Examples to Attain the Benchmark Values

Public R&D
- Policy 3A — PPP R&D (University)
- Policy 3B — PPP R&D (college/Polytechnics)

Private R&D
- Policy 1 — Private R&D SR&ED (4.3%/yr inc)
- Policy 2 — Private R&D IRAP (1.5%/yr)
  - Private/public R&D ratio
  - # Product Opportunities

HQP
- Policy 4 — Private R&D linked HQP in workforce
- Policy 5 — SME receptor capacity 1st HQP jobs
- Policy 6 — VC HQP management incentive

Risk capital
- Policy 7 — Deal flow linked VC invest incentives
- Policy 8 — Risk partner with pre-seed $ angel
- Policy 9 — First user/demo risk reduction

| | Column 1 | Column 2 | Column 3 | Column 4 |
|---|---|---|---|---|
| | Existing BC | | Benchmark | |
| | Inputs | Outputs | Inputs | Outputs | Target increase |
| | $ 867 | 39 | $ 867 | 39 | |
| | $ 979 | 653 | $ 2,601 | 1734 | 166% |
| | | 1.13 | | 3.00 | 156% |
| | | 691 | | 1,773 | |
| | | 6.2/100 | | 10/1000 | |
| | $ 107 | 173 | $ 274 | 443 | 156% |

| | BC Value | Benchmark Target | Magnitude of Change Needed |
|---|---|---|---|
| R&D | | | |
| Private/public R&D ratio | 1.13/1 | 3/1 | |
| (i) Private &PPP R&D increase | 39* | ( * value held constant for the analysis) | ($1622) =166% |
| # Public R&D product opportunities* | | | |
| (ii) # PPP & Private R&D product opportunities | 653 | 1773 | 1120 = 156% |
| HQP | | | |
| (iii) HQP/1000 workforce | 6.2/1000 | 10/1000 | 3.8/1000 = 73% |
| Risk Capital | | | |
| (iv) # investments ~¼ product opportunities | 173 | 443 | 270 = 156% |

Fig. 9C

| | Column 1 | Column 2 | Column 3 | Column 4 | Column 5 | Column 6 | Column 7 | Column 8 | Benchmark |
|---|---|---|---|---|---|---|---|---|---|
| | Year 0 | | Year 5 | | Year 10 | | Year 20 | | |
| | Inputs | Outputs | Inputs | Outputs | Inputs | Outputs | Inputs | Outputs | |
| Knowledge Capital Policies | | | | | | | | | |
| Exisiting Public R&D | $ 867 | | $ 867 | 39 | $ 867 | 39 | $ 867 | 39 | $ 867 |
| Policy 1A  PPP R&D (University) (0.5%/yr inc) | | | 43 | 29 | 43 | 29 | 87 | 58 | |
| Policy 1B  PPP R&D (college/Poly)(0.5%/yr inc) | | | 43 | 29 | 43 | 29 | 87 | 58 | |
| Exisiting Private R&D | $ 979 | 653 | 979 | 653 | 979 | 653 | 979 | 653 | |
| Policy 2  Private R&D SR&ED (4.3%/yr inc) | | | 208 | 139 | 416 | 277 | 832 | 555 | |
| Policy 3  Private R&D IRAP (1.5%/yr) | | | 10 | 7 | 10 | 7 | 20 | 13 | |
| Policy increase in PPP + Private R&D | | | $ 305 | 203 | $ 513 | 342 | $ 1025 | 684 | |
| Total Private & PPP R&D | | | $ 1,284 | | $ 1,492 | | $ 2,004 | | $ 2,601 |
| Private/public R&D ratio | | 1.13 | | 1.48 | | 1.72 | | 2.31 | 3.00 |
| # Product Opportunities | | 691 | | 894 | | 1,033 | | 1,375 | |
| Increase over "status Quo" | | | | 29% | | 49% | | 99% | |
| Human Capital Policies | | | | | | | | | |
| Exisiting HQP researchers | | 6.2/1000 | | 6.2/1000 | | 6.2/1000 | | 6.2/1000 | |
| Policy 4  S&T hiring credits (30$ /year– 3.3%) | | | | 1.03 | | 2.06 | | 3.1 | |
| Policy 5  S&T Researcher hiring (30$/yr –3.3%) | | | | 1.03 | | 2.06 | | 3.1 | |
| Policy 6  First Jobs in S&T (30$/yr –3.3%) | | | | 1.03 | | 2.06 | | 3.1 | |
| Policy increase in HQP researchers | | 6.2/1000 | | 3.1/1000 | | 6.2/1000 | | 9.3/1000 | |
| # HQP researchers in workforce | | 6.2/1000 | | 9.3/1000 | | 12.4/1000 | | 15.8/1000 | 10/1000 |
| Increase over "status Quo" | | | | 50% | | 100% | | 150% | |
| Risk Capital Policies | | | | | | | | | |
| Existing private risk capital | $ 107 | | $ 107 | | $ 107 | | $ 107 | | |
| Existing (public) risk capital | $ 20 | | $ 20 | | $ 20 | | $ 20 | | |
| Policy 7  IP Acquisition | | | $ 36 | | $ 65 | | $ 100 | | |
| Policy 8  VCC link to prod opps | | | $ 22 | | $ 45 | | $ 68 | | |
| Policy 9  Demo risk reduction | | | $ 45 | | $ 52 | | $ 60 | | |
| Policy Increase in risk capital | | | $ 102 | | $ 162 | | $ 228 | | |
| Total risk Capital Investment | | | 229 | | 289 | | 355 | | |
| Increase over "status Quo" | | | 95% | | 151% | | 213% | | |
| ProductOpp/investment ratio | | 4/1. | | 4/1. | | 4/1. | | 4/1. | 4/1. |
| Total # Risk Investments | | 173 | | 224 | | 258 | | 344 | |
| Increase over "status Quo" | | | | 29% | | 49% | | 99% | |

Fig. 10A

| Type of Policy | Policy Example | Level 1 Metrics | Actual | Best Practices | Cost Yr 1 | Cost Yr 10 | Cost Total | 10 Year Enhanced | Improvement Value Yr 1 | Improvement Value Yr10 | Improvement Value Total |
|---|---|---|---|---|---|---|---|---|---|---|---|
| Knowledge capital | | | | | 14% | 13% | 13% | | | | |
| Innovation Process | | Public R&D | $580 million | $580 million | | | | $580 million | | | |
| Framework policy: | SR&ED @ 10% topup | Private R&D | $700 million | $700 million | $ 7 | $ 50 | $ 293 | $1094 million | $ 51 | $394 | $ 2,282 |
| Blanket policy | IRAP SME R&D @ 20% | | | | $ 3 | $ 30 | $ 164 | | $ 30 | $ 298 | $ 1,636 |
| Focused policy | Univ partner R&D @20% | | | | $ 1.9 | $ 1.9 | $ 19 | | $ 10 | $ 10 | $ 100 |
| | | | | | $ 2.4 | $ 17.8 | $ 110 | | $ 12 | $ 87 | $ 571 |
| | | Private/public R&D ratio | 1.2 | | | | | 1.9 | | 0.7 | |
| Linkage processes | | R&D partnerships | | | | | | | | | |
| | | disclosures | TBD | 444 | | | | 444 | | | |
| | | patents filed | TBD | 222 | | | | 222 | | | |
| | | patents issued | TBD | 111 | | | | 111 | | | |
| | | licenses | TBD | 56 | | | | 56 | | | |
| | | Public R&D product opps (ICUs) | | 28 | | | | 28 | | | |
| | | Private R&D product opps (ICUs) | | 467 | | | | 729 | | 262 | 262 prod opps |
| | | Total product ops (ICUs) | | 495 | | | | 757 | | | |
| Human capital | | | | | 21% | 28% | 16% | | | | |
| Enabling processes | | sci & eng/10,000 workforce | 6.1/10,000 | | | | | 8.9/10,000 | 0.3 | 2.8 | |
| Framework policy: | sci/eng/10,000 | RSA | TBD | | | | | | | | |
| Blanket policy | double capacity | Total R&D KBE Co. | 1188 | | | | | 1855 | | 667 | 56% |
| Focused policy | VC skills @ 20% | KBE Co. 0-50 empl | 888 | | | | | 1386 | | 498 | 56% |
| | | KBE Co. 50-500 empl | 246 | | | | | 384 | | 138 | 56% |
| | | KBE Co. >500 empl | 24 | | | | | 37 | | 13 | 56% |

Fig. 10B

| Type of Policy | Policy Example | Level 1 Metrics | Actual | Best Practices | Cost Yr 1 | Cost Yr 10 | Cost Total | 10 Year Enhanced | Improvement Value Yr 1 | Improvement Value Yr 10 | Improvement Value Total |
|---|---|---|---|---|---|---|---|---|---|---|---|
| Financial capital | | Total (VC) financial capital | $550 million | | $ 19 | $ 112 | $ 405 | $943 million | $ 92 | $ 402 | $ 2,521 |
| Framework policy: | IP acquisition @ 20% | | | | $ 2 | $ 13 | $ 76 | | $ 8 | $ 66 | $ 380 |
| Blanket policy | VCC tax incentive @ 35% | | | | $ 6 | $ 46.0 | $ 267 | | $ 34 | $ 263 | $ 1,522 |
| Focused policy | First user risk reduce @10% top up | | | | $ 5.0 | $ 7.0 | $ 62 | | $ 50 | $ 73 | $ 619 |
| Commercialization process | | Pre-com Prod/Pre-seed $ | $ 63 | 122 | | | | $ 48 | | 71 | |
| | | Commercial Prod/Seed $ | $ 37 | 41 | | | | $ 64 | | 24 | |
| | | Growth/ Venture | $ 128 | 41 | | | | $ 226 | | 24 | |
| | | Expand/Mezzanine | $ 328 | 25 | | | | $ 605 | | 15 | |
| | | Total # financings | | 229 | | | | 363 | | 134 | |
| | | co. market capitalization | $757 million | | | | | $1200 million | | $443 million/yr | 59% |
| | | KBE/GDP (1188/5339 x $3.4B) | 8.9 | | | | | 31.7 | | 3.5 times increase | |
| Innovative capacity | | (Priv/pub R&D)2 x HQP | | | $ 26 | $ 162 | $ 698 | | $ 143 | $ 796 | $ 4,803 |
| Policy Total | | | | | 18% | 20% | 15% | | | | |

Former Fig. 12D is eliminated and now included in Fig. 12C

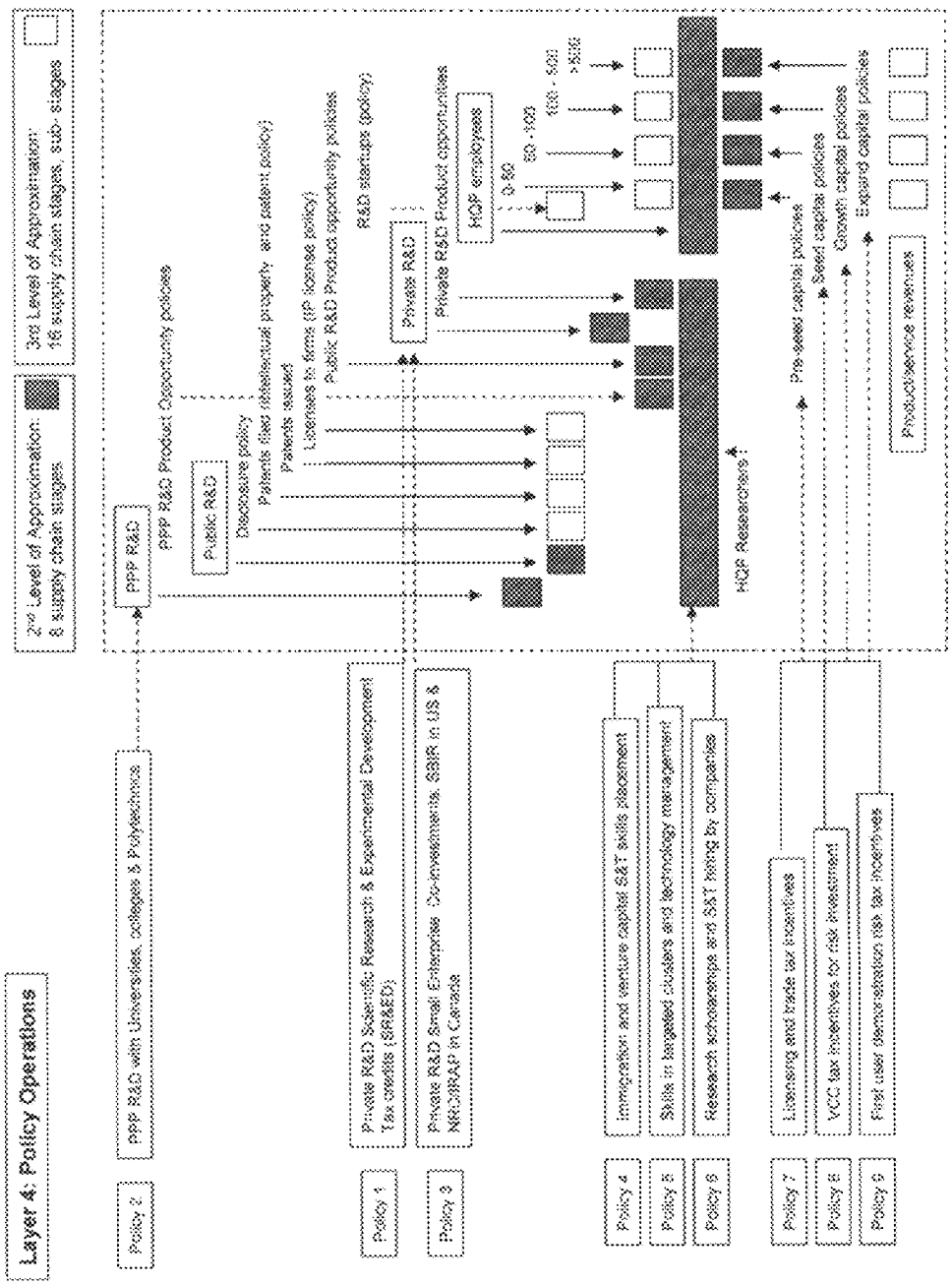

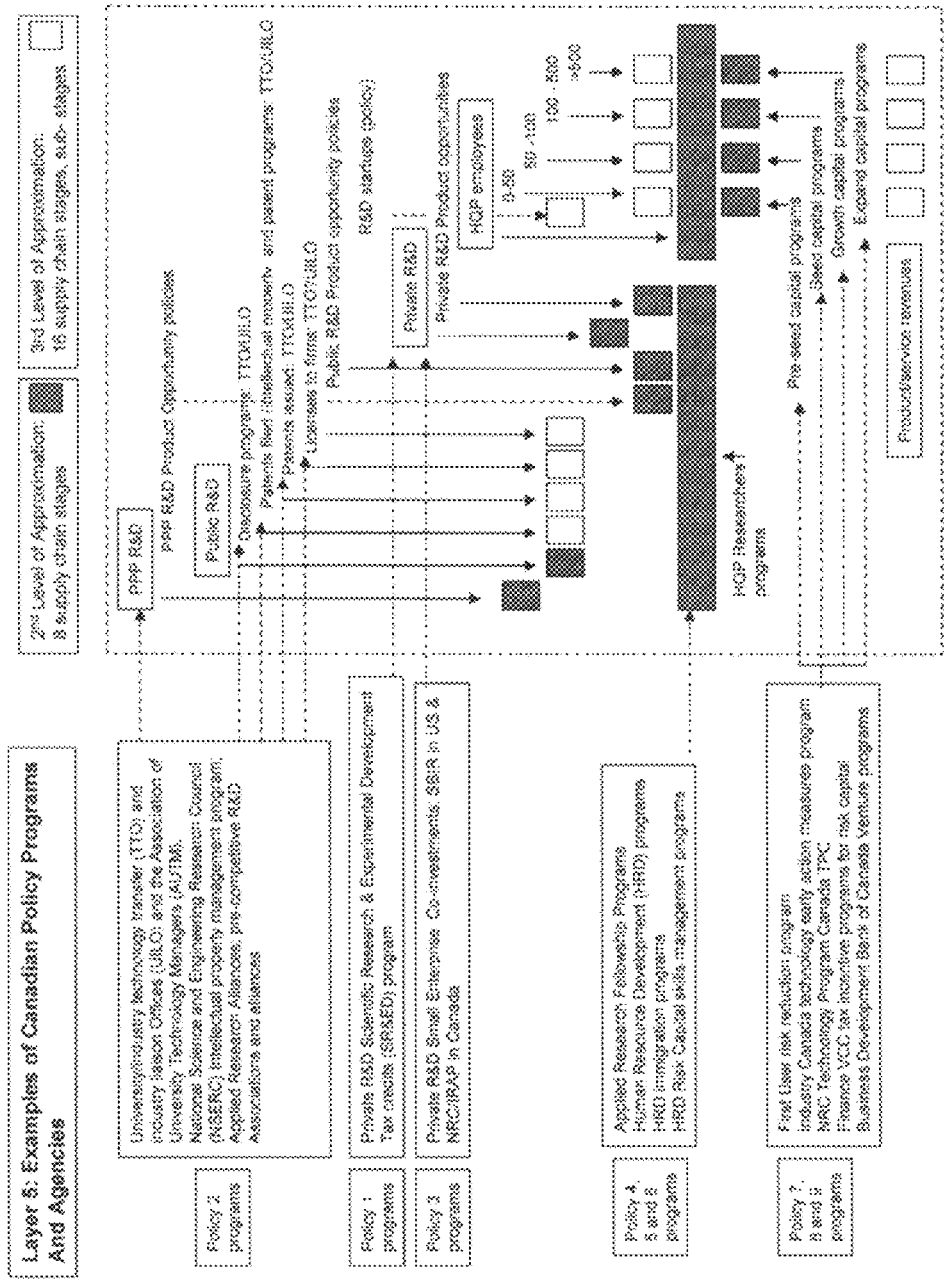

METHODS AND SYSTEMS FOR OPTIMIZATION OF INNOVATIVE CAPACITY AND ECONOMIC VALUE FROM KNOWLEDGE, HUMAN AND RISK CAPITAL ASSET SETS

This Nonprovisional Application claims benefit of the earlier filing date of Provisional Application series code and Ser. No. 60/774,597 with filing or 371(c) date of Feb. 21, 2006 and confirmation number 3353.

BACKGROUND OF THE INVENTION

1. Field of the Invention

The disclosed methods and systems relate generally to optimization, and more particularly to the optimization of innovative capacity, which is an economy's potential, at a given point in time, for producing a stream of commercially relevant innovations, and the economic value of knowledge, human and risk capital asset sets and more particularly to a method of performing an analysis of policy operations that optimize innovation and commercialization performance for large aggregates of enterprises contributing to the knowledge based economy of nations, states, provinces and industry sectors.

2. Background Information

There are a number of teachings in the prior art describing business systems within individual enterprises and firms that include: (a) methods for performing portfolio analysis using quantified data for making investment decisions and for optimizing the resource budget as taught by Huettl et al. in US Patent Application Publication No. U.S. 2004/0024673 published on Feb. 5, 2004; (b) methods and systems for optimization of economic value from asset sets for manufacturing processes within the firm by Martin in U.S. Patent Application Publication No. 2005/0234815 published on Oct. 20, 2005; and (c) enterprise information evolution analysis systems and methods as taught by Hatcher et al. in U.S. Patent Application Publication No. 2004/0093244 published on May 13, 2004. These prior art teachings do not incorporate systems comprised of aggregates of several firms or collections of both private and public assets in industry sectors, provincial, state or national economies with a focus on innovation, commercialization and the knowledge based economy.

Traditionally, there has been no effective way to optimize the economic performance of the knowledge, human and risk capital asset set or sets contained within the innovation and commercialization process so that maximum innovative capacity and economic value is achieved from each of the assets in the set or from the combination of assets. There has been no accepted common method, or process for first determining the optimal balance among sets of assets that include public research and development (called public R&D herein), private research and development (called private R&D herein), highly qualified personnel (called HQP herein)—that may be further categorized as HQP researchers and HQP management—and risk venture capital; and second, the set of policy operations that best optimize innovative capacity and economic value for the knowledge based economy that is primarily driven by investments in these assets. The common approach to this problem has been to report independent data and indicators for various types of assets that are deemed to influence innovation, commercialization and economic value but not to report quantitative relationships among these assets. There are several shortcomings of this approach.

First, in the absence of defined relationships among assets there have been few means of determining either the individual contribution of each asset or the collective contribution of the assets to innovative capacity or economic value.

Second, effective economic modeling to the stage and sub-stage level has been very difficult to accomplish because of the inherent complexity of the innovation and commercialization process and its sub-processes and the absence of common definitions for stages and sub-stages within the process and sub-processes. The lack of sufficient knowledge related to asset inter-relationships has limited their quantification and the development of accepted models for innovative capacity and economic value. There has also been limited success in decomposing the asset base to the stage, sub-stage and even more detailed levels, as shown in layer 1 of FIG. 1 and then to try to model and fairly attribute value at each stage or sub-stage. Existing approaches have not been able to address complex asset combinations at the process stage level. This has severely limited the availability of such metrics.

Third, combining sub-process asset models into process models for larger asset sets is also extremely complex and there has been insufficient knowledge of input and output indicators related to innovative capacity to do so.

Traditionally in innovation and commercialization processes, most asset investment data have been reported annually. Since progress in developing economic value along the stages in the innovation and commercialization process may occur over long time periods of many years and often more than a decade, the impact of a specific asset or of a specific policy operation within the overall process on economic value at any particular time has been difficult to discern from the current reporting system. Thus, there is a need to determine how economic value is affected by changes in policy operations at the progressive stages and sub-stages in the innovation supply chain continuously over time at progressively more and more detailed levels of approximation.

SUMMARY OF THE INVENTION

In an embodiment of the invention, there is provided a method of determining, for a set of knowledge, human and risk capital assets on which policy operations are performed, settings for the policy operations that result in the assets producing optimal innovative capacity and economic value. The policy operations include use of the assets over time. The method includes prioritizing innovative capacity asset driver performance measures, where performance measures comprise economic performance data, recognizing that the asset drivers are all inter-related and interdependent. The method further includes performing, during a time period, a process. The process includes:

calculating expected levels of innovative capacity according to best practice benchmark data for the policy operations, storing these calculated data and then collecting and storing, as policy operations are performed on the assets, ongoing operational performance data about the assets and the settings that produced the data; and then comparing these calculated and operational performance data;

calculating and storing, economic performance data from the collected policy operational data; and determining, for the high priority innovative capacity asset driver performance measure or measures, those settings that will result in optimal innovative capacity and economic value from the assets for that measure, by identifying the optimal value for the measure over a period of time both from calculations based upon benchmark data and by identifying the set of settings that produced the optimal value during that period of time.

The method also includes determining, for each of a plurality of successive policy performance measures in order of decreasing priority, the settings that will result in optimal innovative capacity and economic value from the assets for each measure, by repeating the above process with sets of settings that do not result in a substantial improvement change in the value of any higher-priority measure from its identified optimal value.

In a related embodiment, the method may also include setting initial settings for the policy operations, where the initial settings are the settings determined according to the process, and the process has been repeated for the plurality of successive measures; displaying at least one of the performance measures; and determining if changes made to the initial settings result in further optimal economic value being derived from the assets, by:

changing at least one of the initial settings;
viewing the displayed measure over time to learn if the at least one changed setting has positively impacted the measure; and
if there is a positive impact on the measure, then maintaining the at least one changed setting, and if not, returning the at least one changed setting to its initial setting.

In a further related embodiment, the method may also include repeating the process for the high priority innovative capacity asset driver performance measure or measures and the plurality of successive measures to determine further settings; comparing the further settings to the current settings to determine any differences between the current settings and the further settings; and changing the current settings to the further settings if there are positive differences.

In another related embodiment, storing may occur in a database or process historian. In a further related embodiment, the database or process historian may be part of a process control system, and collecting and calculating may occur within the process control system.

In another embodiment, there is provided a computer system configured to determine, for a set of assets on which policy operations are performed, settings for the policy operations that result in the assets producing optimal innovative capacity and economic value, where policy operations include alteration of investment in the assets or their use, and the settings and policy operations change over time. The computer system is configured to prioritize innovative capacity asset driver performance measures, where performance measures comprise innovative capacity and economic performance data, and perform, during a time period, a process. That process includes:

collecting and storing, as policy operations are performed on the assets, operational performance data about the assets and the settings that produced the data;
calculating and storing economic performance data from the collected operational data; and
determining, for the high priority innovative capacity asset driver performance measures, those settings that will result in optimal innovative capacity and economic value from the assets for that measure, by identifying the optimal value for the measure over a period of time and identifying the set of settings that produced the optimal value during that period of time.

The computer system is also configured to determine, for each of a plurality of successive innovative capacity asset driver performance measures in order of decreasing priority, the settings that will result in optimal economic value from the assets for each measure, by repeating the above process with sets of settings that do not result in a substantial change in the value of any higher-priority measure from its identified optimal value.

In a related embodiment, the computer system may be further configured to set initial settings for the policy operations, where the initial settings are the settings determined according to the process, and the process has been repeated for the plurality of successive measures; display at least one of the innovative capacity asset driver performance measures; and determine if changes made to the initial settings result in further optimal innovative capacity and economic value being derived from the assets, by:

changing at least one of the initial settings; viewing the displayed measure over time to learn if the at least one changed setting has positively impacted the measure; and
if there is a positive impact on the measure, then maintaining the at least one changed setting, and if not, returning the at least one changed setting to its initial setting.

In yet a further related embodiment, the computer system may be further configured to repeat the process for the highest-priority innovative capacity asset driver performance measure and the plurality of successive measures to determine further settings; compare the further settings to the current settings to determine any differences between the current settings and the further settings; and change the current settings to the further settings if there are positive differences.

In another related embodiment, the computer system may be a process control system.

In another embodiment of the invention, there is provided a method of calculating innovative capacity and economic value generated from the operations performed on a set of assets over a period of time as those operations change. Operational performance data is collected and stored as operations are performed on the assets. The method also includes calculating and storing innovative capacity and economic performance data from the collected operational performance data, where the economic performance data comprise innovative capacity asset driver performance measures; determining a benchmark value for each asset driver performance measure over the period of time; and determining, for each measure, the difference between the current value of the measure and the benchmark value of the measure.

In a related embodiment, storing may occur in a database or process historian. In a further related embodiment, the database or process historian may determine the benchmark value for each innovative capacity asset driver performance measure and measure ratios among the drivers over the period of time. In still a further related embodiment, the database or process historian may be part of a process control system, and collecting, calculating, and determining the difference all may occur within the process control system.

BRIEF DESCRIPTION OF THE DRAWINGS

The invention description below refers to the accompanying drawings, of which:

FIG. 7A is a table of asset settings, benchmark values and empirical relationships; FIG. 7B provides these values in Layer III for the second level of approximation for examples of three nations (Finland, US, and Canada), two Provinces (British Columbia and Alberta), two States (California and Massachusetts) and an industry sector (the Canadian energy sector).

FIG. 8B is an example of policy operations that may be applied for nations, states provinces.

FIG. 9A provides examples of the base asset settings for one Canadian province, British Columbia, the target increases that are required to attain the benchmark settings and the nine example policies illustrated in FIG. 8B that may be applied to transition asset settings towards these benchmark settings; FIG. 9C illustrates the changes in asset settings for application of all nine of the example policies and the calculated values in terms of the increased number of product opportunities resulting therefrom as a partial measure of innovative capacity.

FIG. 12D shows the linked set of input/output indicator pairs for the public R&D portion of the supply chain.

FIG. 13D shows examples of the policy operations data sets (Layer IV) for the second and third levels of approximation. FIG. 13E shows examples of Canadian policy implementation programs and agencies (Layer V) for the second and third levels of approximation.

DETAILED DESCRIPTION OF AN ILLUSTRATIVE EMBODIMENT

Figure 1:
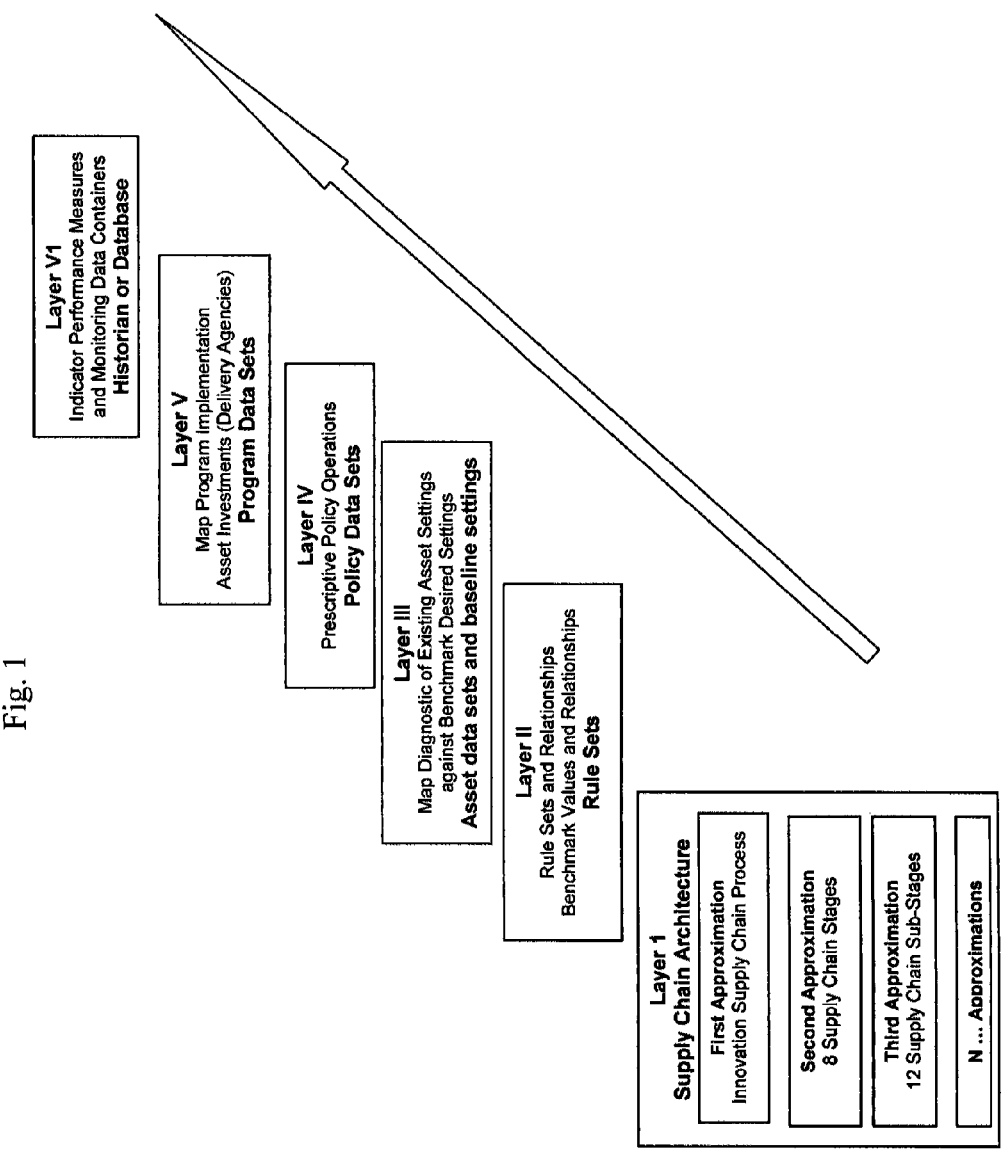
FIG. 1 shows an architecture for mapping collections of public and private organizations as systems and processes. The Figure illustrates three levels of approximation of progressively increasing supply chain detail in terms of six Layers of types of data sets including: (I) supply chain stages, (II) rule sets, (III) benchmarks, (IV) policy operations, (V) policy implementation programs and agencies and (VI) indicator performance measure (IPM) data sets.

To provide an overall understanding, certain illustrative embodiments will now be described; however, it will be understood by one of ordinary skill in the art that the systems and methods described herein may be adapted and modified to provide systems and methods for other suitable applications and that other additions and modifications may be made without departing from the scope of the systems and methods described herein.

Unless otherwise specified, the illustrated embodiments may be understood as providing exemplary features of varying detail of certain embodiments, and therefore, unless otherwise specified, features, layers, levels of approximation, stages, sub-stages components, modules, and/or aspects of the illustrations may be otherwise combined, separated, interchanged, and/or rearranged without departing from the disclosed systems or methods. Additionally, the stages and sub-stages are also exemplary and unless otherwise specified, may be altered without affecting the scope of the disclosed and exemplary systems or methods of the present disclosure.

"Optimized", "optimal" and/or "optimum," and further, "maximum" and "minimum," and derivatives thereof, as used-herein, may be understood to be within the context of which such terms are presented in the disclosed embodiments, e.g., with respect to the relationships presented and/or disclosed, as mathematically or other expressed, in relative terms, and/or as otherwise understood in the art.

"Operations" as used herein may be understood to include policy alterations performed on an asset. When an operation is being performed on an asset or assets, the asset or assets is/are either being maintained, reduced or enhanced by an incremental investment associated with the policy.

The methods and systems described herein utilize the availability of innovative capacity and economic performance measures of assets such as measures of innovative capacity in terms of product and process opportunities and economic value in terms of new product and process revenues and jobs or other like measures of innovative capacity and economic data generated thereby. These innovative capacity and economic measures are directly calculated from operational performance data that are collected annually from national, state, provincial and industry sector statistics published by most national, state and provincial jurisdictions. To compute innovative capacity and the economic value of the assets, certain economic information related to the collected operational data are needed. This economic information may come from a variety of sources, such as but not limited to national, state, provincial and industry sector innovative capacity models that are constructed or embedded within the process control system. This makes the asset, innovative capacity and economic information available for analysis from time to time and at any time the data are collected. The innovative capacity and economic value of a policy operations-related activity related to any of the assets is thus discernable by calculating the value using the collected operational data and the innovative capacity and economic information taken from the variety of sources.

The operational performance data and the innovative capacity and economic performance data are all stored within a storage module, such as but not limited to a database or process historian, where the data are related by time. In a preferred embodiment, both the data storage and innovative capacity and economic performance data calculations occur within a process control system. As the operational performance data are collected, each one is historized, or time-stamped and tagged. The same time-stamp and tag is applied to the innovative capacity and economic performance data calculated from that operational performance data. Over a period of time, a large database of time-related operational performance data, innovative capacity data and economic performance data is produced.

In addition to the operational performance data that is collected, the settings on the asset or assets that caused the operational data to result are also collected, time-stamped, tagged and stored. Similar to operations performed on an asset or assets, the settings of an asset or assets are determined both when the asset or assets is/are being maintained, reduced or increased.

The calculated innovative capacity and economic performance measures provide economic performance data for various aggregates of government and academic public entities and business enterprises and may be used to drive innovative capacity and optimal economic value in at least two ways.

A first way is to display the innovative capacity and economic performance measures to policy analysts and decision-makers in a simple manner and on a real-time and ongoing basis. In trying to keep the innovative capacity output at a maximum value, these personnel may recommend change to the policies and associated investments that control how the asset is operating to achieve maximum output given the change in the condition of the asset. As changes are made to the policies and associated investments, the collected operational performance data will also change. This causes corresponding changes in the innovative capacity and economic performance data calculated from those changed operational performance data. As the changes in the innovative capacity and economic performance data occur, they are shown, in a monitoring "scorecard". This helps decision-makers to determine, through this feedback from the scorecard, how the changes they make to the settings of an asset or assets impact innovative capacity and economic output from the asset or assets within their domain of control.

Merely displaying the economic performance data in real-time or from time to time in the scorecard may not lead to optimal innovative capacity or economic value being produced from the assets. Over time, the economic value goals of the economy and its assets will change, just as the settings also change over time. Thus, to make optimal use of innovative capacity economic performance data in the scorecard, the data may be presented in a prioritized format, such that the current primary economic goal is displayed first, followed by a secondary goal, a tertiary goal, and so forth. Prioritization of the displayed economic performance data may be accomplished by contextualizing the data to the innovative capacity and economic development strategy. This contextualization may be done by prioritizing the financial models for each policy or process stage or sub-stage according to the economic strategy of the jurisdiction. To accomplish this, the innovation and commercialization strategy, which is commonly developed for a nation as a whole, may be decomposed to the innovation or commercialization process or sub-process and process stages and sub-stages within these areas). This process identifies the indicator metrics for yield in terms of innovative capacity output that may be attributed to each stage or sub-stage and the program or agency associated with each stage or sub-stage These metrics may then be displayed according to attributed input and impact on overall innovative capacity and economic value and may be reported to the managers and decisions makers responsible for the appropriate unit, agency or program.

Any number of innovative capacity and economic performance measures may be displayed. In a preferred embodiment, the initial number of measures of innovative capacity and economic performance data displayed is limited to three types of resource: R&D, HQP and risk capital, with five identified resource assets: (1) public R&D, (2) private R&D, (3) HQP (researchers), (4) HQP (management) and (5) risk capital. Even for this small set of assets, the inter-relationships are still a little complex, but they must be clearly understood within the overall process.

For example, a primary metric is the ratio of private R&D/public R&D. Related secondary metrics are the number of product and process opportunities per million dollars invested in private R&D, in public R&D and in total R&D. An equally important primary metric is the ratio of private R&D/HQP (researchers). The objective of the management of the R&D and HQP assets is to find the optimal balance between private R&D and public R&D and between private R&D and HQP (researchers) at the same time. Using these prioritized performance measures in this manner leads to a level of multi-objective optimization that has not previously been attainable. In total, this approach will tend to move policy operations on the assets toward an innovative capacity and economic optimum continuously over time, while also facilitating determination of a quantitative optimal point of policy operations and the settings of the assets that produce the optimal point.

The availability of timely innovative capacity and economic performance measures also leads to a number of new opportunities in determining how to use this new information to better understand innovation and commercialization processes and to generate solutions for optimizing economic outputs that have been traditionally elusive. One such area of opportunity is the matching of output innovative capacity economic data with input policy operational data to be able to mathematically determine the correlation between policy operations and economics.

A second way to derive optimal economic value by using performance measures is to collect and historize timely economic performance data of the asset set as well as the timely operational performance data of the asset set and the settings of the assets that result in that operational data, as described above. The operational data, settings, and innovative capacity and economic data are then analyzed over a time period of interest. The database or process historian or similar device produces a database of time-sequenced operational performance data, settings, and economic performance data that may be time-resolved and analyzed. By applying optimization methods to the time-correlated operational and economic performance data for a time period of interest, it is possible to determine optimal policy operating parameters in a quantitative manner while also accommodating time lags among data at various stages of the process.

To properly analyze the operational and economic performance data, it is necessary to know how the economic performance of an asset relates to utilization of the asset over long periods of time. These relationships are expressed in various models and correlations among models described below, and have not previously been known. Knowing these models and relationships described therein and the relationships among them enables clear tracking and understanding of how policy operational changes, reflected in the changes to the investment settings of assets, truly impact the prioritized economic variables in the innovation and commercialization process. Though these models are typically used to analyze historical data, they may also be used to predict the innovative capacity and economic impacts of operational changes to the settings of assets. This prediction may either be utilized to quantitatively determine the results of a program or investment action or to advise policy analysts and the policy operations decision-makers on the impact of each of a number of "what-if" policy scenarios, enabling the personnel to determine those policy and program investment settings that result in optimal innovative capacity and economic value for a set of circumstances. For example, "if" a policy operation A is implemented, then "what" is the resultant change in innovative capacity produced? "If" policy operation B is implemented, "what" is the alternate level of innovative capacity produced? This prediction may be determined by using a quantitative method or methods to back-calculate the optimal asset combinations that result in optimal economic value generated by the asset set under analysis.

Rather than using assets in an asset analysis model without the knowledge of the inter-relationships among the innovative capacity asset drivers, an economic-operational model according to the current invention uses the overall asset value of more complex asset sets, such as but not limited to sub-stages, stages, sub-processes or the entire innovation and commercialization process. The availability of economic performance data at a number of the stage and sub-stage process unit levels also enables the model of the current invention.

The process involves definition of asset relationships and desired benchmark values that may be characterized by several mathematical relationships based upon models of innovative capacity, empirical and observed relationships, and the combination of these taken together. These benchmarks and relationships are then applied to the assets of a jurisdiction. This produces the existing asset settings. Policy operations are then applied to move these existing settings towards the desired benchmark settings via successive sets of policy "what-if" scenarios that illustrate differences between the existing settings with various policy operations applied and the desired benchmark settings. The benchmark values and relationships among the assets are described next.

The models used in the current invention are characterized by some important benchmarks, benchmark values and observed relationships. The benchmarks are normalized by expressing them per unit of investment input. This permits comparison among jurisdictions and all program investments and agencies within a jurisdiction that contributes to a stage or sub-stage on an equivalent dollar for dollar investment basis rather than on a per capita or other basis. Each benchmark is assigned a specific desired benchmark value that is often based on what is observed in highly innovative economies.

Several benchmark values in the first portion of the process are inter-related. One benchmark expresses a ratio between the system's R&D drivers, and another, the ratio of the HQP researcher driver that contributes to the conduct of this R&D per the number of workers in the entire working population. They both must be achieved together to increase competitiveness.

A first benchmark relates to the private R&D/public R&D ratio and also its desirable value: R&D either funded or performed by the private sector/R&D both funded and performed by the public sector $\geq 3/1$ [Benchmark (1)]. The numerator in this fraction includes R&D that is either funded, or carried out, by the private sector. This is important since R&D funded by industry but performed in the public sector (for example in universities) has much greater impact on more immediate commercialization outputs than other public R&D. The denominator includes only R&D that is both funded by, and preformed by, the public sector. Because public sector R&D serves many purposes beyond commercialization, it has a much lower commercialization economic payoff than does private sector R&D.

A 1999 US Council on Competitiveness model indicates that the comparative influence of increases in investment in private R&D and HQP are 15 times and 10 times greater respectively than the influence of an equivalent increase in investment in public R&D on the level of the innovative capacity. Private sector R&D performed generates 15 times more product opportunities than public R&D performed. It follows that short term innovative capacity is enhanced by higher private/public R&D ratios. These are at or near 3/1 in the most successful of the innovating countries that include the United States, Sweden and Finland.

One interim measure of innovative capacity is the total number of product and process opportunities that are generated by both public R&D and private R&D performed. A product and process opportunity may be defined as the results of public R&D often including one or more of a proof of concept, prototype, patent and/or license that may be provided to a firm for commercialization. It is also defined as a pre-commercial product or process created from private R&D. Based upon a model utilizing data for more than 200 North American universities over more than 15 years, that is a part of the current invention, the general level of product opportunities from public R&D approximates $(million) R&D/22.5. This outcome, taken in conjunction with the results of the 1999 US Council on Competitiveness model above, indicates that the level of product opportunities from private R&D approximate $(million) private R&D/1.5.

A second important benchmark ratio is also related to the public R&D driver. It is the ratio public R&D/private and public dissemination of results from public R&D: $R&D both funded and performed by the public sector/Dollars spent on private and public dissemination of results from public R&D=20/1 [Benchmark (2)]. The numerator is the total dollar amount of R&D that is both financed and carried out by the public sector, while the denominator is the amount that is applied to develop partnerships between the performer of the public R&D and industry as well as for intellectual property management and dissemination of research results for public benefit. The Canadian Advisory Council on Science and Technology recommends that this ratio be about 20/1, i.e., 5 cents out of each public R&D dollar for the commercialization of university research.

In a rapidly changing world, the vast majority of firms must conduct some R&D whether formal or informal, whether to develop new technologies or to adopt and adapt those developed by others. To do so, they require highly qualified research personnel defined above as HQP researchers. A third benchmark ratio relates the private R&D driver to the HQP researchers driver and its desirable value: R&D either funded or performed by the private sector/HQP researchers=3/2 [Benchmark (3)].

A fourth benchmark defines the desired proportion of HQP researchers in the workforce. Evidence from the most innovative societies suggests that at least ten HQP researchers per thousand workers is a desirable benchmark value: HQP (mainly research scientists and engineers/total workforce) >10/1000 [Benchmark (4)].

The ability of a jurisdiction to generate and commercialize new knowledge depends on combining HQP, public R&D and private R&D in the right proportions. One such set of proportions is defined by a fifth benchmark index of innovative capacity. It gets its desired benchmark value of 90 by definition since it is benchmark (2) multiplied by the square of benchmark (1): Index of innovative capacity=HQP researchers per 1000 work persons×(private/public R&D)$^2$=(ratio #3)×(ratio #1)$^2$=90 [Benchmark (5)]. This relationship is not based on a rigorous empirical relationship proven to exist among the three parameters HQP researchers, private R&D, and public R&D; rather it is a representation that applies the same numerical relationships that produces results that closely mirror those of the 1999 US Council on Competitiveness Index based on a much more complex model. A key part is played by the same variables in the same relative proportions (15 parts private R&D to 1 part public R&D and 10 parts HQP).

Two empirical relationships are also important. First, it is observed that it takes about $1.5 million of private R&D or $22.5 million of public R&D to generate one new product opportunity. Thus product opportunities are created in the ratios 1 product opportunity/$1.5 million private R&D=1/1.5 and 1 product opportunity/$22.5 million public R&D=1/22.5. The total level of R&D-created product opportunities developed is found by applying these ratios to the total private and public R&D and then summing the two resulting values: Product opportunities=$(million) public R&D/22.5+$ (million) private R&D/1.5 [Empirical relation (1)] Since there may not be direct observational data on the number of product opportunities created in any period, the above empirical relation may be used to calculate an estimate of that number from the observed expenditures of private and public R&D.

The second is an apparent empirical relationship between the number of product opportunities generated from R&D by small and medium sized enterprises with less than 500 employees (SMEs) and the amount of risk venture capital invested in them. There is general consensus in the venture capital industry that the number of venture investments is dependent upon the number of product opportunities available for investment in combination with the quality of management HQP associated with each of the product opportunities. One observed amount of venture capital in terms of both (i) the total level of venture investment and (ii) the proportion of the number of investments in a jurisdiction is roughly proportional to the total number of product opportunities available for investment: Total number of venture capital investments/Number of product opportunities=1/K [Empirical relation (2)]. This relationship is observable in data and appears to be in the order of 1/4 for the number of investments in Canada (or in the range of 25% of the total number of opportunities in aggregate at any given time.) This would result in a value of K in the order of 4. However the amount of data observed is still insufficient to put a precise value on this ratio.

There are two reasons for selecting the above set of five benchmarks and two empirical relationships over numerous others reported in the literature and often used to characterize innovation. First, these benchmarks focus on the key asset drivers that provide greatest influence on innovative capacity and commercialization in the 1999 US Council of Competitiveness Index. Second, these ratios can be related to levels of interim and final outputs per unit of R&D asset investment.

These quantitative relationships can be found between levels of both public and private R&D investments based largely on U.S data (when the U.S. ranked very high in innovative capacity) and their respective returns on investment as measured by the number of commercialization opportunities that are generated. These may be cause/effect relationships. The functional form of these cause/effect relationships e.g., Y=F (X) may be expressed as follows: (i) Benchmark 1: private R&D=X (public R&D) where X≧3; (ii) Benchmark 2: Public R&D=20 (public R&D for results dissemination); Benchmark 3: HQP=0.001 (# scientists and engineers in the workforce); (iii) Benchmark 4: Innovative capacity=HQP(private R&D/public R&D)$^2$ where HQP is the total of HQP/1000 i.e. a number like 10; (iv) Relationship 1: Public R&D product opportunities=(1/22.5)(public $R&D millions); Private R&D product opportunities=1/1.5(private $R&D millions); Total R&D product opportunities/$ million=(1/22.5+1/1.15}/2=0.51; and (v) Relationship 2: # venture capital investments=K (# product opportunities) where one example of K approximates 4.

Key benchmark settings and relationships include: (i) private/public R&D performance ratio≧3/1; product opportunities/$ million R&D≧0.51; (iii) HQP (researchers)≧10/1000; (iv) private R&D/HQP (researchers) investment ratio 3/2; and (v) number of venture risk investments/number of SME product opportunities ~¼.

The asset drivers involved in these benchmark relationships combine to generate innovative capacity and economic value within the innovation and commercialization supply chain for the knowledge based portion of the economy. The driver relationships may be described in several different embodiments of the supply chain at progressively increasing levels of detail of the stages and sub-stages. Three levels of approximation in three related embodiments are illustrated in FIG. 1 and in successive Figures described in more detail below.

Figure 2:
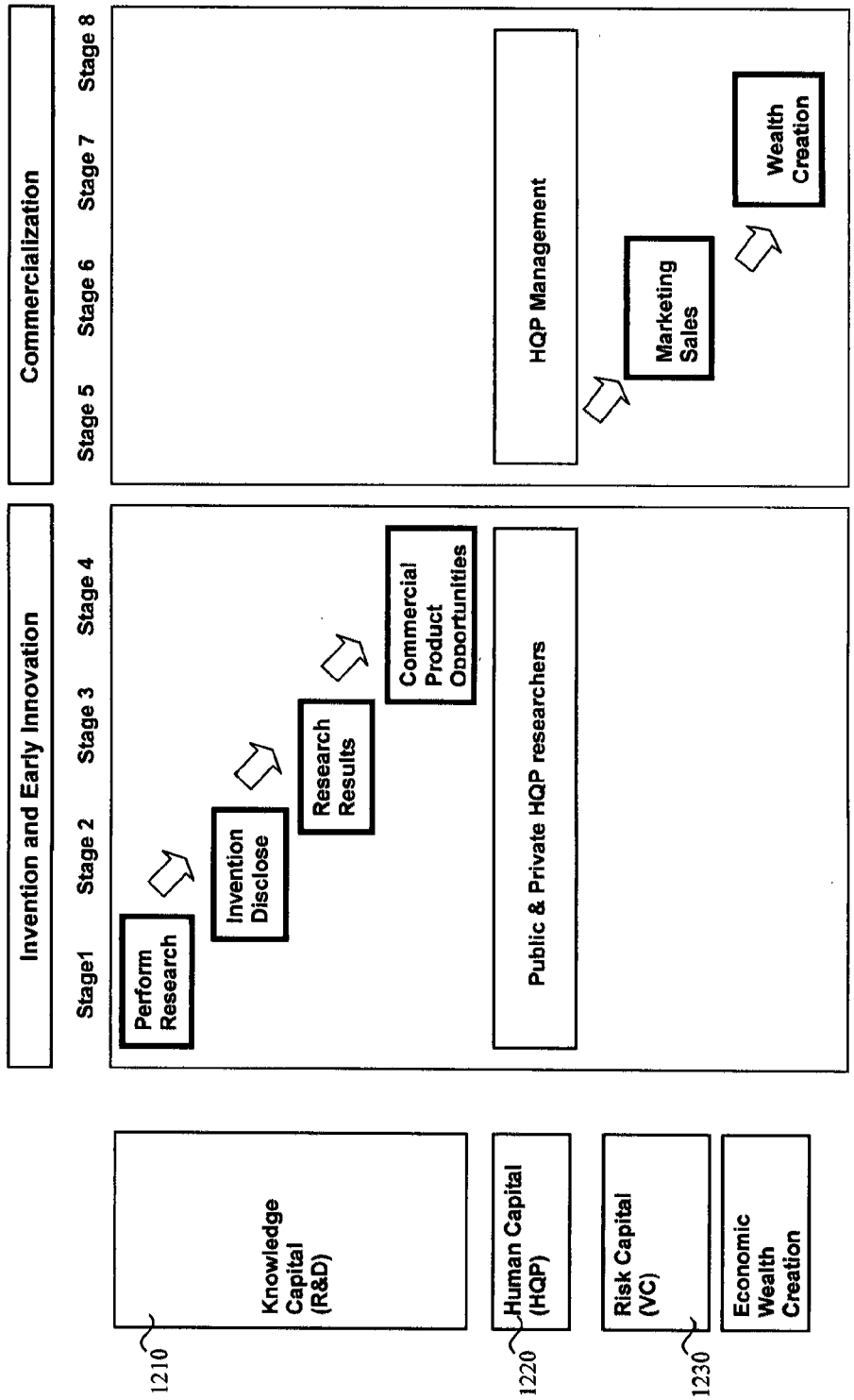
FIG. 2 shows an example decomposition of the innovation and commercialization process at a first level of approximation for innovative capacity and economic development derived from research and development (R&D).

In one embodiment, a "first level of approximation" is illustrated in FIG. 2, wherein the process of technological change can be thought of as a flow or 'supply chain': Pure research=>invention=>applied R&D=>a commercializable product=>marketing=>sales=>wealth creation.

Figure 3:
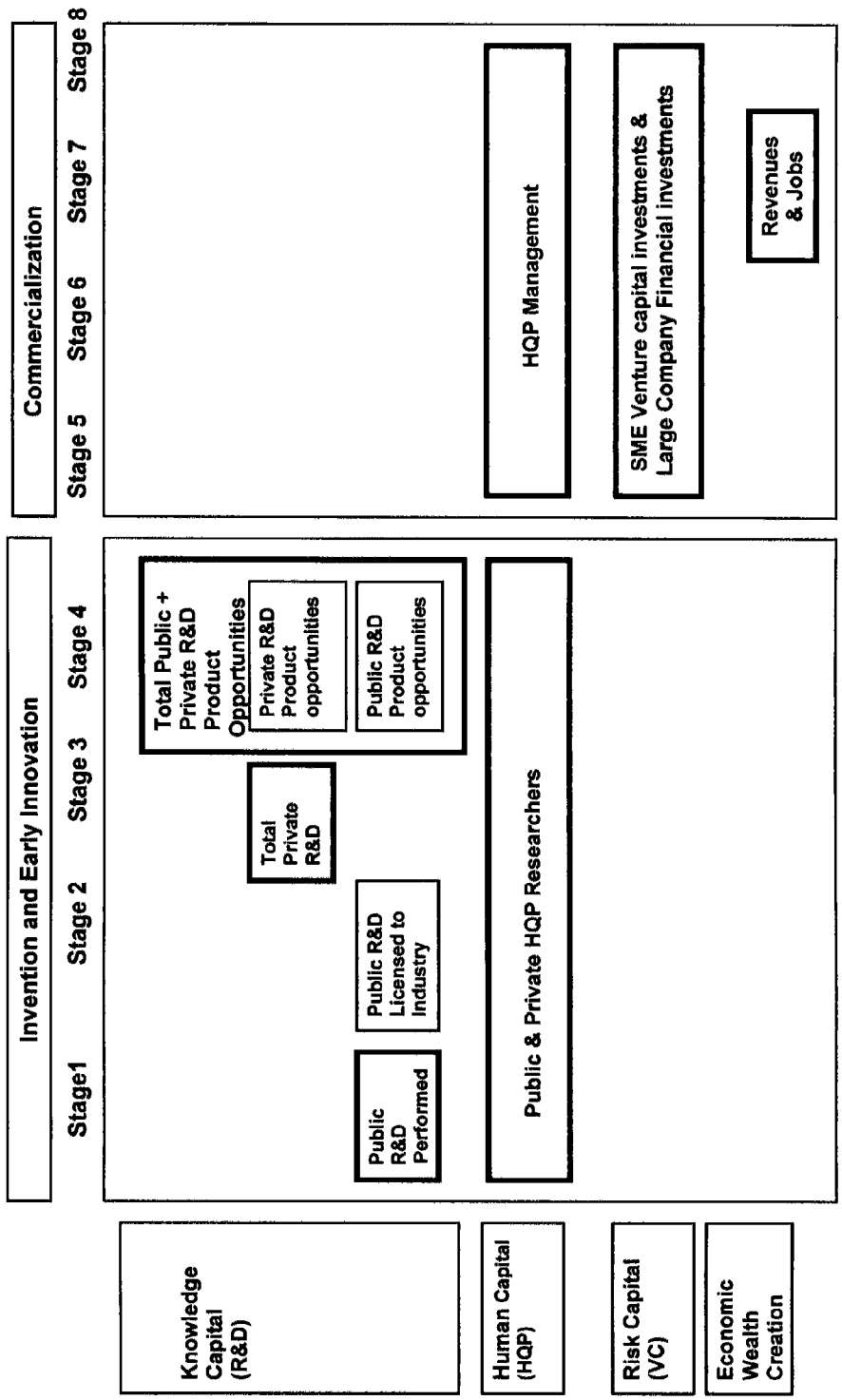
FIG. 3 shows an example decomposition of the innovation and commercialization process at a second level of approximation and stages in the supply chain for knowledge capital assets focusing on public R&D and private R&D, human capital assets focusing on HQP researchers and HQP management as well as risk capital investments leading to economic wealth creation.

A further embodiment illustrated in FIG. 3 shows a "second level of approximation" of the general architecture of the innovation supply chain, with its successive stages shown in more detail illustrating both public R&D and private R&D processes and then the commercialization of product opportunities. Both the public sector's and the private sector's measured R&D usually leads to proof of concept, then development of a prototype. Either or both of these may generate product opportunities that companies may then develop into marketable outputs with the support of venture capital investments (as shown in the supply chain stage 4 in FIG. 3).

Figure 4:
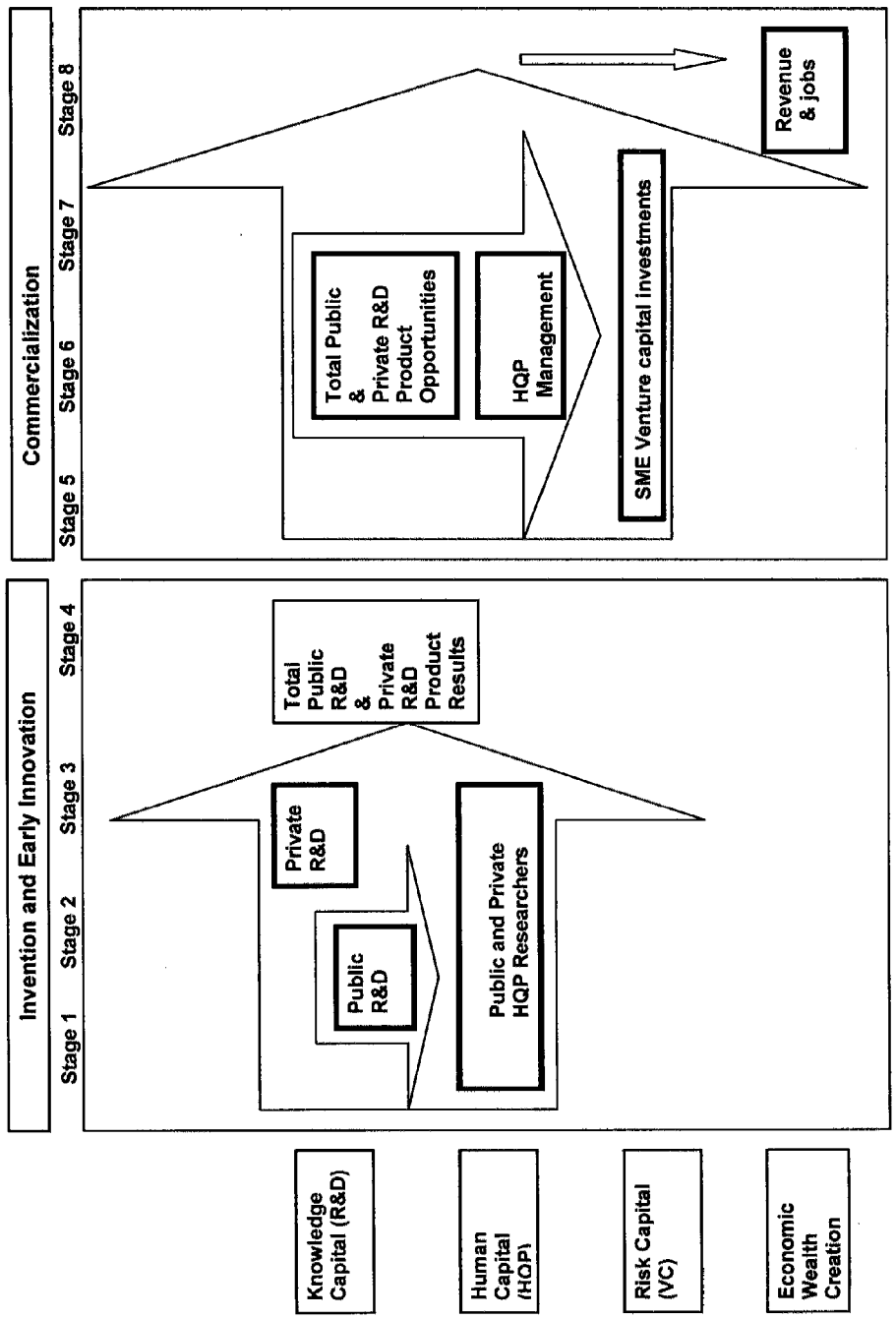
FIG. 4 shows a process and method of determining settings related to key process relationships that produce optimal economic value from assets in Layer I at the second level of approximation of the supply chain.

The major innovation and commercialization asset driver process relationships at this second level of approximation are illustrated in FIG. 4. In the first portion of the process, invention and early innovation, the education system and public R&D generates the majority of HQP researchers. These HQP researchers undertake both public and private R&D that may result in new product and process opportunities. The yield of product opportunities in combination with HQP management that meet the risk/reward investment criteria of the venture capital industry may attract risk capital in the second commercialization portion of the supply chain. This combination of product opportunities plus HQP management and risk investment capital then may generate wealth for products and processes that achieve market acceptance.

Figure 5:
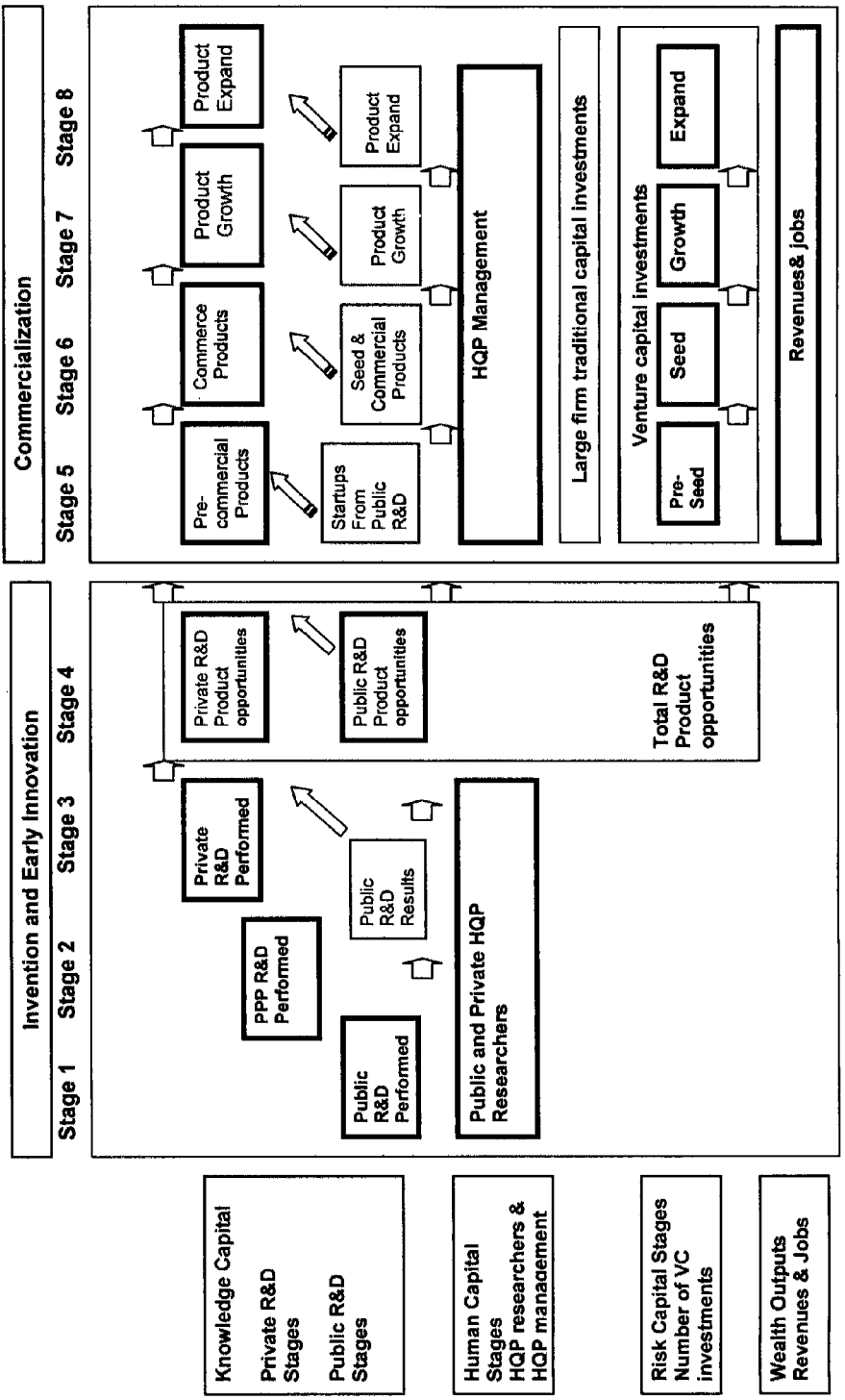
FIG. 5 shows eight stages (in Layer I of the second level of approximation) of the supply chain for each of the public R&D sub-process and the private R&D sub-process.

A further more detailed embodiment at this second level of approximation is illustrated in FIG. 5. Product opportunities produced by either private R&D or public R&D may continue on to pre-commercial development of a product or process (stage 5), then its refinement into a commercially viable entity, and then to the marketing of a new product or process (stage 6). This in turn may lead to product (and company growth and/or expansion) of very successful ventures (in stages 7 and 8). The results of public sector R&D, as shown by stage 1, can flow in either of two distinct paths. First, they can be disseminated directly to the private sector, as shown by the upper left hand arrow. Second, they can be kept in the public sector until some later stage of their development. This second possibility is shown by the lower supply chain process for the public sector, which parallels that of the private sector in the upper flow. The broken arrows show that at each stage of further development the results can be passed over to the private sector. Carrying the public sector flow right through to the marketing of a new product or process is uncommon, except where there are nationalized industries.

The benchmarks and relationships at the second level of approximation may be used to compare jurisdictions and the extent that they deviate from each other and from the desired benchmark settings. One embodiment addresses R&D and related product opportunity settings and trends. Another addresses settings and trends in HQP to determine if HQP appears to be a limiting factor to innovative capacity and economic value growth. A third addresses settings that reflect uptake rates of venture capital in relation to the availability of product opportunities. A final embodiment knits all three of these together in an inter-dependent package to assess the overall set of settings that reflects the innovative capacity of the economy.

Figure 6A:
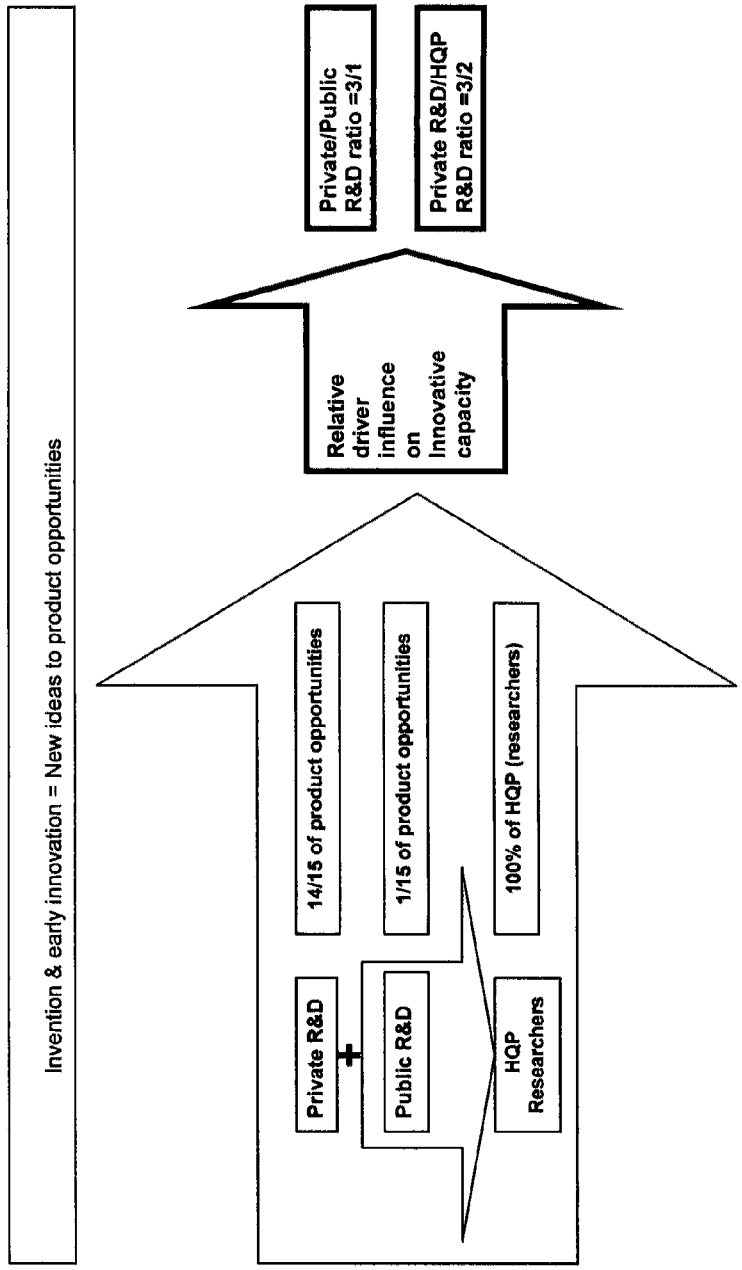
FIG. 6A shows Layer II of the second level of approximation and describes quantitative process relationships and rule sets as well as the benchmark ratios and values. The related FIG. 6B and FIG. 6C for the early innovation portion of the supply chain provide an example method for determining settings related to key process relationships that produce optimal innovative capacity value; likewise FIG. 6D and FIG. 6E for the later innovation and commercialize portion of the supply chain provide the relationship between the outputs of the early innovation portion of the process that may then result in new wealth creation with the involvement of HQP management and risk capital.
Figure 6B:
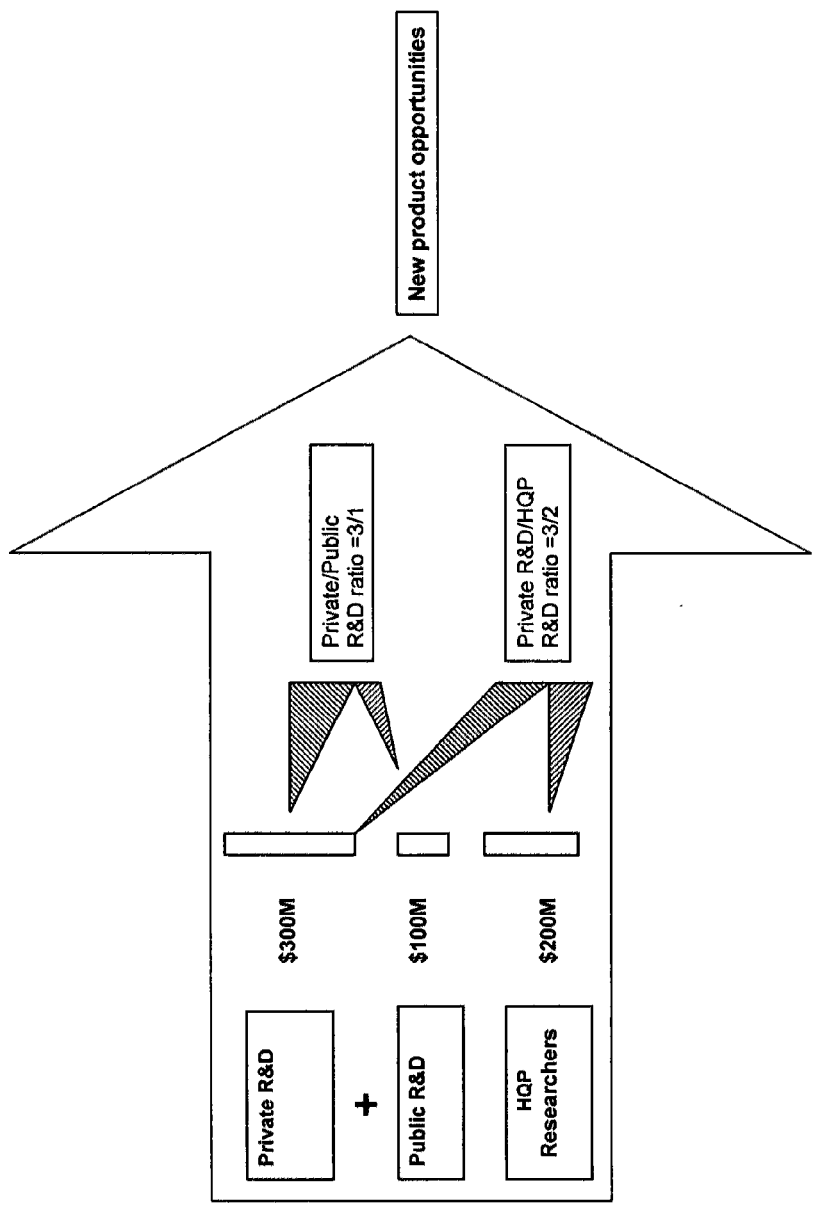
Figure 6C:
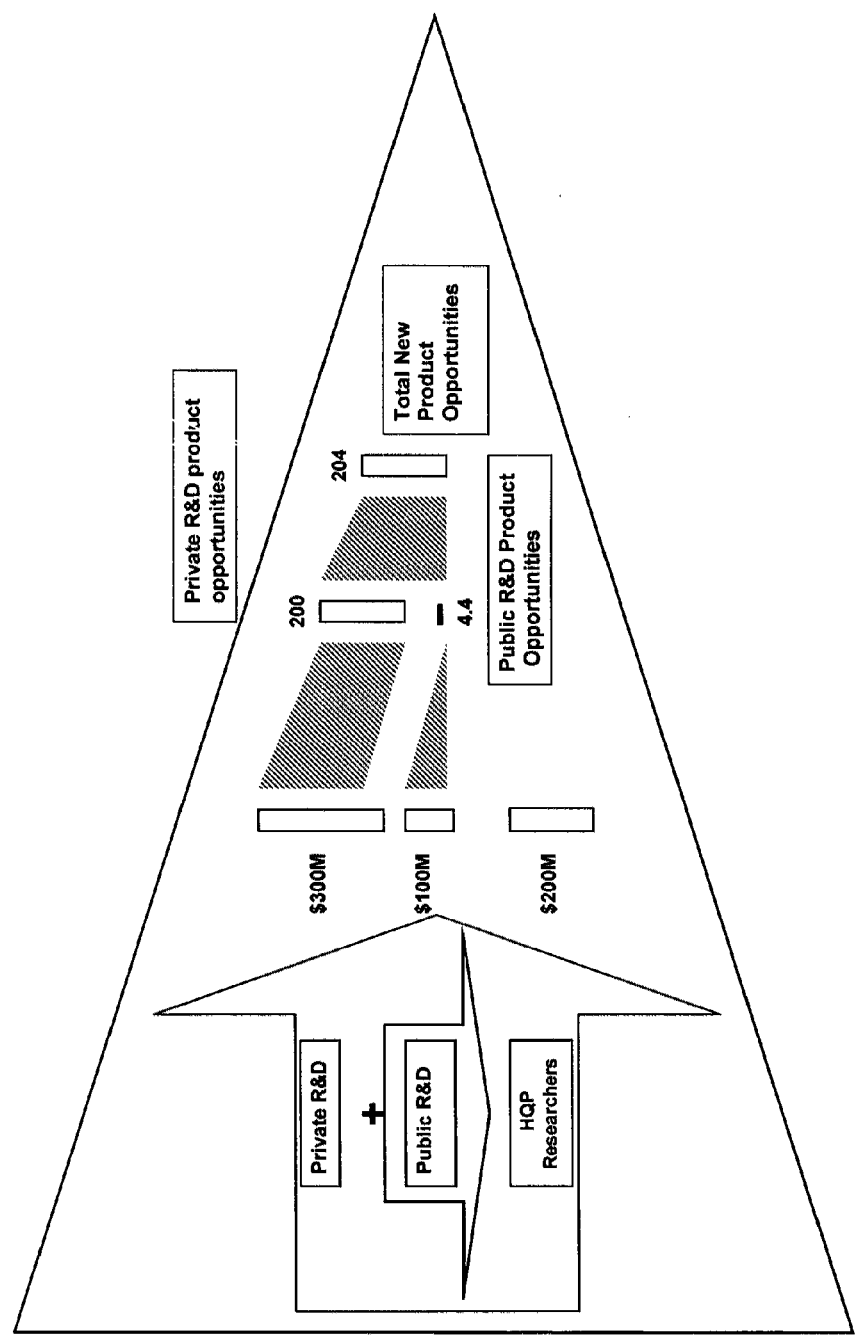
Figure 6D:
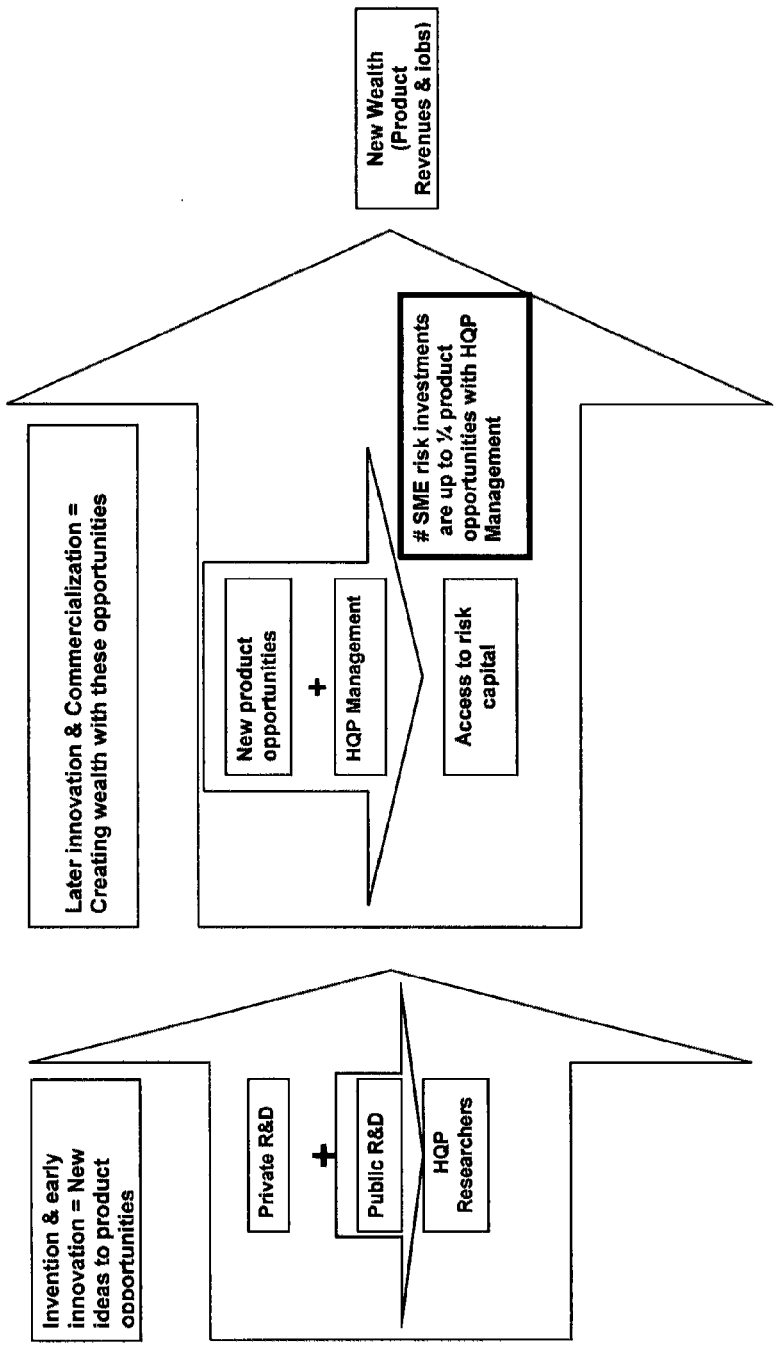
Figure 6E:
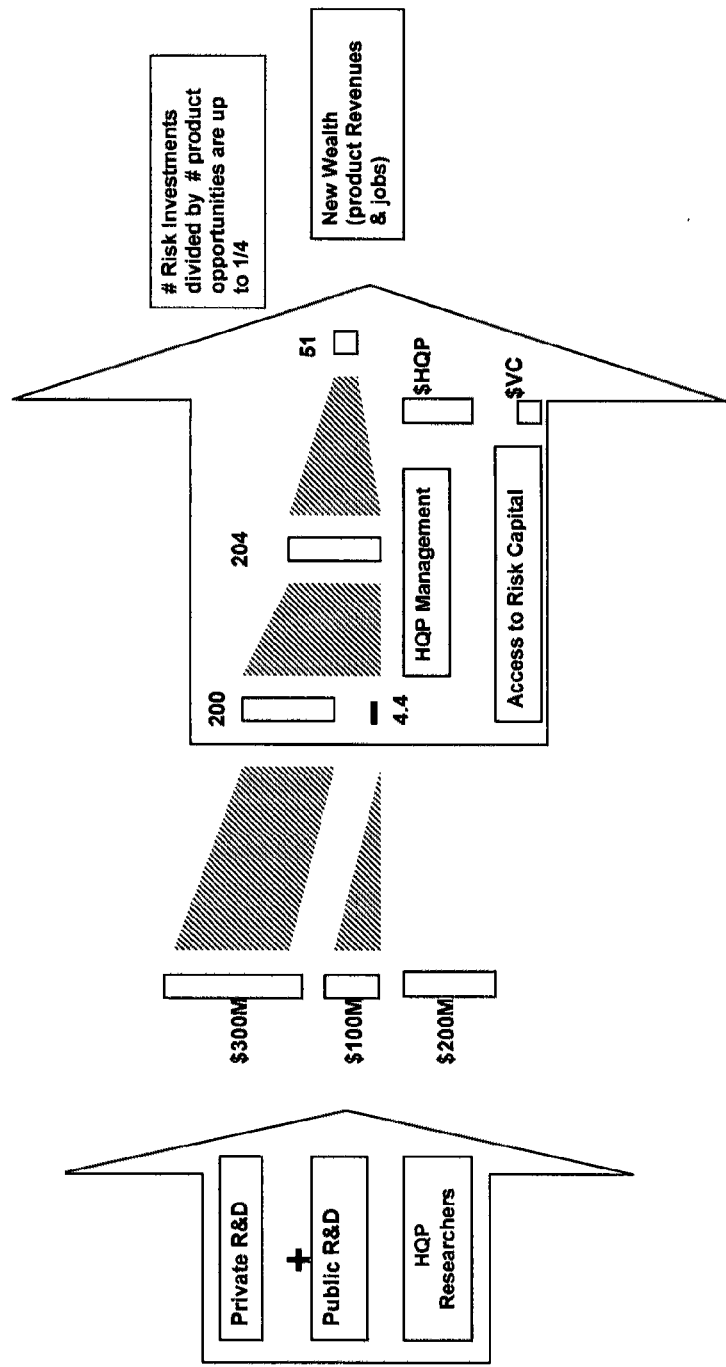

The benchmark relationships are illustrated in FIG. 6A-FIG. 6E. FIG. 6A shows relationships for the innovation portion of the supply chain: (i) public R&D produce 100% of HQP researchers and 1/15 of product opportunities; (ii) private R&D produces 14/15 of product opportunities; (iii) the private/public R&D ratio of 3/1 and (iv) the desired benchmark private R&D/HQP researcher ratio of 3/2. FIG. 6B illustrates an example of benchmark asset relationships normalized for $100 million of public R&D. This would then require $300 million private R&D and $200 million HQP researchers. FIG. 6C then illustrates the levels of private R&D, public R&D and total generated product opportunities—200, 4.4 and 204.4 respectively. FIG. 6D illustrates the commercialization benchmark relationship between product opportunities and the number of risk venture investments and FIG. 6E illustrates the process leading to 51 risk investments for the benchmark example.

In one embodiment, an example using historical data asset settings for three national jurisdictions—Canada, U.S. and Finland—for two different periods, 1997/98 and 2002/03, are compared in FIG. 7 using several of the asset benchmarks taken together to illustrate key asset relationships. Then policy operations may be applied to move the ratios in the direction of the ideal benchmark ratios.

Benchmark (1) and empirical relation (1) are first analyzed together: (i) the private/public R&D ratio and (ii) the number of product opportunities/$million R&D. The first five columns in FIG. 7 give public R&D performed, R&D funded and/or performed by the private sector, the actual private/public R&D ratio benchmark value, the number of R&D generated product opportunities calculated using Association of University Technology Managers reported data and the index of product opportunities per million R&D dollars. The calculation for the product opportunities is the sum of public $million R&D/22.5+ private $million R&D/1.5—i.e. for Canada in 1997/98 this is 5895/22.5+8744/1.5=6,091 and for 2002/03 it is 9500/22.5+11,244/1.5=7,918. The calculation of product opportunities/$million R&D for Canada in 1997/98 is 6,091 divided by total $ million R&D (5,895+8,744=14, 638) or 6,091/14,638=0.42 and for 2002/03 it is 7,918/20, 744=0.38. For the same level of public R&D in 2002/03 ($9,500) and a 3/1 private/public ratio, the level of product opportunities would equate to 0.51 which is the benchmark value. The percentage figures in FIG. 7 show the changes over the 6 year period for the figures given above them in that column.

In column 3 of FIG. 7, private/public R&D ratios for Canada, U.S. and Finland, are calculated using data from columns 1 and 2. Over the 6 year period, between 1997/98 and 2002/03 this ratio for Canada declined 20% from 1.48 to 1.18; the U.S. ratio declined slightly from 2.82 to 2.70 while that of Finland rose 27% from 1.94 to 2.46. As a consequence of these trends in the private/public ratio, the level of product opportunities per million dollars of R&D spending (column 5) indicates (i) a declining rate of innovative capacity and product opportunity output capability in Canada, (ii) relatively static capability in the U.S. and (iii) a strongly rising capability in Finland.

These relationships are important for the creation of economic value. During this period when the Canadian R&D ratio moved unfavourably (column 3), the level of public R&D (column 1) increased significantly by 61% or more than 10% per year; private R&D (column 2) also increased 29% or about 5% per year, and hence the level of total product opportunities (column 4) also increased consistent with the rate of increase of private R&D at 5% per year—all of which appear to be very desirable outcomes. From these data one might infer that Canada was progressing well. But what is more relevant, is the total level of product opportunities being produced per $million of R&D and the rate of increase of product opportunities relative to the rate in other jurisdictions, both of which depend on the R&D ratio since private R&D has most influence in this. Since this ratio moved unfavourably in Canada, the rate of increase and hence the total availability of new product opportunities and the potential for developing economic value is less than that it would have been if the R&D ratio had moved in a favourable direction.

In terms of comparative innovative capacity competitiveness, the level of Finish product opportunity generation was much higher from the same level of investment than in Canada. In other words, the number of product opportunities per new million dollars of R&D is higher in Finland. Canada is falling behind even though the number of product opportunities is increasing. Even if the ratio of product opportunities per million dollars of R&D were to stay constant and not to decline as it did in Canada, this also implies a loss of competitiveness and a less than optimal innovative capacity and economic output.

In another embodiment, benchmark (3) may be related to the amount of private sector R&D: (i) HQP researchers/total workforce, and (ii) private R&D. HQP researchers play a major part in determining private R&D capability, developing receptor capacity, which largely determine the availability of new product opportunities. Management (HQP) is the most important criteria for venture capital investors who are more concerned with quality and availability of good management than technology. FIG. 7 includes a comparison of the level of HQP researchers which is the number of research scientists and engineers per 1000 workforce in column 6.

Comparative ratios of HQP researchers in 2002/03 (column 6), are 6.4 per 1000, 9.0 per 1000 and 15.8 per 1000 for Canada, U.S. and Finland respectively. Compared to the benchmark target setting of 10 per 1000, the level of HQP in Canada is low and rose over the 6 year period at 3% per year while private R&D grew slightly faster at 5% per year. This low level of HQP is similar to the low ratio of private/public R&D. The level of HQP in the US was relatively high among innovative nations at 9.0 but only grew at slightly less than 2% per year whereas private R&D rose at 6% per year—a relatively low and constraining growth rate. The HQP level in Finland is superior and grew at almost 5% per year while private R&D grew almost 12% per year consistent with the high rate of increase in the private/public R&D ratio which also grew at slightly less than 5% per year in Finland. The optimal HQP/private R&D relationship is 2/3 over time. Private R&D requires HQP to grow, and HQP growth depends on industry investment in increased R&D. In this respect, Canadian values for both the private R&D and HQP rates of increase are in the order of 1/2 of those in Finland and reflect lower comparative innovative capacity competitiveness.

The rate of change in private R&D, relative to the rate of change in HQP is important. Low rates of change in private R&D and/or in HQP will constrain competitive growth towards optimal economic value. The difference in the growth rates of each of these provides an indication of which of these factors, private R&D or HQP, may be the limiting factor for product opportunity growth and hence deserving of special policy operation attention. Long term trend data over 2 decades show almost equivalent high rates of growth of both HQP and private R&D in Finland, but lower growth rates in HQP than in private R&D in both Canada and the US. This suggests that neither HQP nor private R&D appear to be a constraint in Finland but that HQP appears to be constraining private R&D growth and future innovative capacity competitiveness in both Canada and the US.

In a further embodiment, empirical relationship 1 is related to overall innovative capacity: (i) the number of product opportunities and dollar amount of venture capital investment and (ii) the aggregate benchmark: innovative capacity. The level of R&D generated product opportunities that may be successful in attracting venture risk investment can be correlated with actual levels of placement of venture capital investment in small and medium enterprises (SMEs). For example, if there were 1000 investment opportunities available at any given time involving product opportunities generated from R&D by SMEs, and all things considered, if there were to be an overall 25% investment rate in new product opportunities, then up to 250 would receive risk investment of one size or another. The number of investment opportunities rather than the amount of venture capital available is usually the constraining factor.

This relationship may be illustrated by comparison of similar total levels of R&D for two Canadian provinces, British Columbia (BC) and Alberta in year 2000 (in FIG. 7). Despite comparable total R&D, the ratios of private/public R&D are quite different at 1.3/1 and 0.7/1 as are the amounts of product opportunities produced—530 for BC and 376 for Alberta respectively. These differences in the availability of product opportunities are then reflected in the differences in the number of venture investments in each jurisdiction as shown in Columns 7-11 and the BC total of 91 compared to only 24 in Alberta. The higher amount of venture investments in BC is indicative of the higher private/public R&D ratio and the higher availability of product opportunities in BC.

FIG. 5 illustrates four stages within the risk venture investment portion of the supply chain. FIG. 7 also illustrates examples of asset values for these stages for the chosen jurisdictions which are displayed in columns 7-11. Column 7 represents early stage, low level, high risk angel and other venture investment in the range 0-$500,000, designated "pre-seed" and which is in a risk range and investment size that are not normally acceptable to venture capital firms. Column 8 represents the next stage in the range $500,000-$1,000,000, designated "seed" that is also usually high risk and the target of some higher risk venture investment funds. Column 9 represents the more traditional range of venture firms in the range $1M-$5M designated "growth" and which is sometimes associated with the 'growth' phase of products and firms. Column 10 represents larger investment for later stage company expansion in excess of $5 million designated "expansion" but which is often termed 'expansion investment'. Column 11 is the total of these investments, often reported as the total of risk venture capital.

Trends in risk venture investment in the U.S. and Canada provide guidance regarding general investment rates at each of the successive stages in the supply chain represented by the columns 7-10 in FIG. 7 for the proportion of product opportunities that relate to SMEs. The percentage of total risk capital dollar investment is 3%, 5%, 21% and 75% for these stages respectively and considerably biased towards the later stages. However, in contrast, the greatest number of investments is associated much more with smaller SME firms and early investment stages. Seventy five (75%) percent of investments are at the first two stages combined, 17% are at the growth stage and 4% are at the expansion stage both for the US and Canada. These provide a basis for comparing levels of product opportunity commercialization and innovative capacity development and the relationship between policy operations that foster product opportunities and risk venture investment in these opportunities.

HQP is also important in these four stages. It largely determines the quality of the investment opportunities, the ultimate degree of success in optimizing innovative capacity and economic value, and the rate of return on such investments. A general ranking in the venture investment industry regarding the importance of venture investment criteria is 70% management (HQP), 25% markets and commercialization, and 5% technology related to invention and innovation.

The final column 12 in FIG. 7 portrays the innovative capacity index that incorporates all of the R&D, HQP and venture capital asset investment influences. It is a product of the key inter-dependent benchmark factors—public R&D, private R&D, HQP—and by relationship with all of these, product opportunities and venture capital, as illustrated for Benchmark 5. It provides an indication of comparative innovative capacity competitiveness and the index suggests the general magnitude of policy operation corrective action required. The indices for Canada, the U.S. and Finland are 9, 65 and 96 respectively. The Canadian index is 1/7 that of the U.S. and less than 1/10 that of Finland and in decline.

Figure 8A:
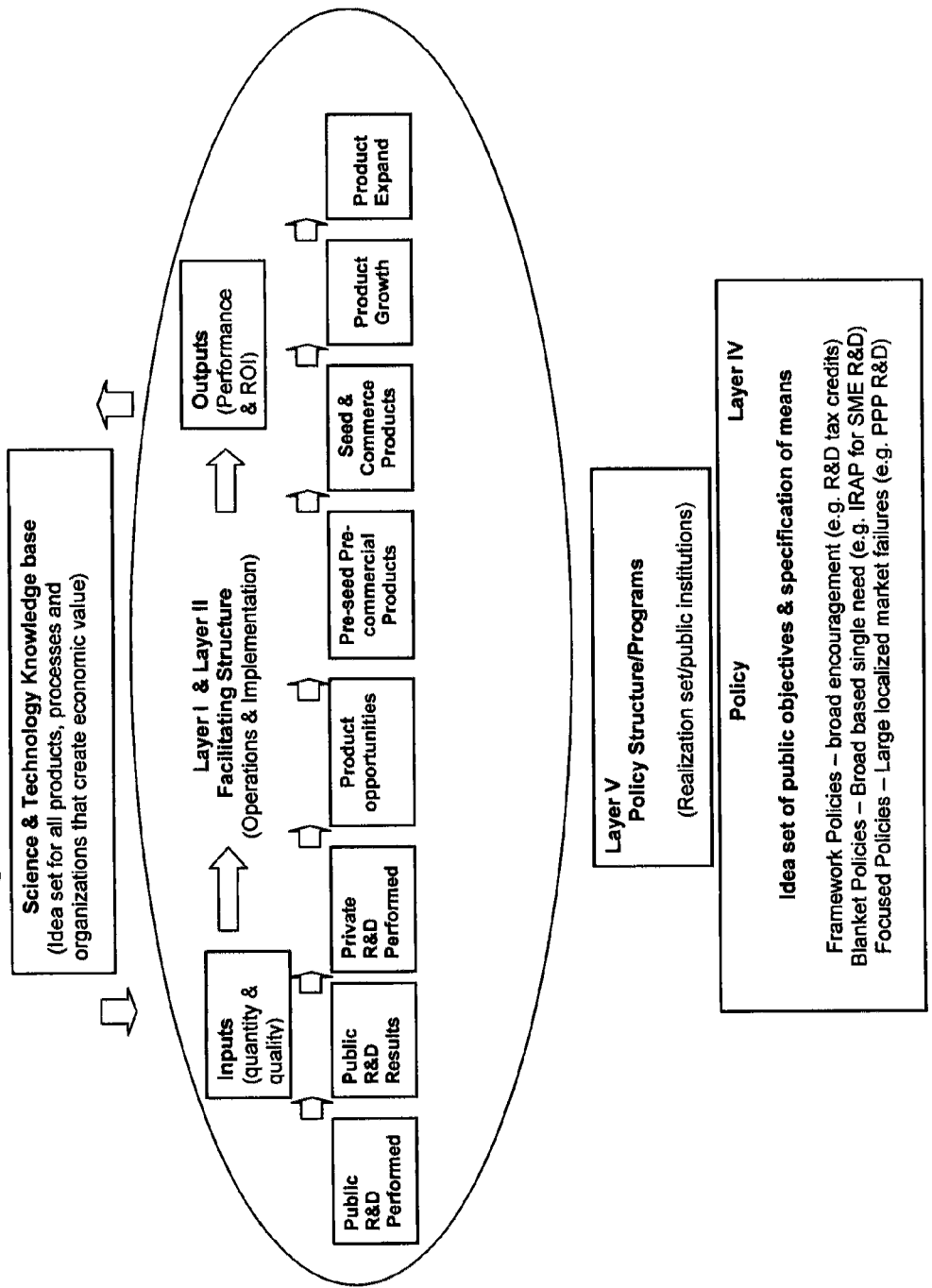
FIG. 8A is one representation of types of policies at Layer IV, policy facilitating structure at Layer I and Layer II and policy operations implementation structure at Layer V that may be applied at the second level of approximation.
Figure 8C:
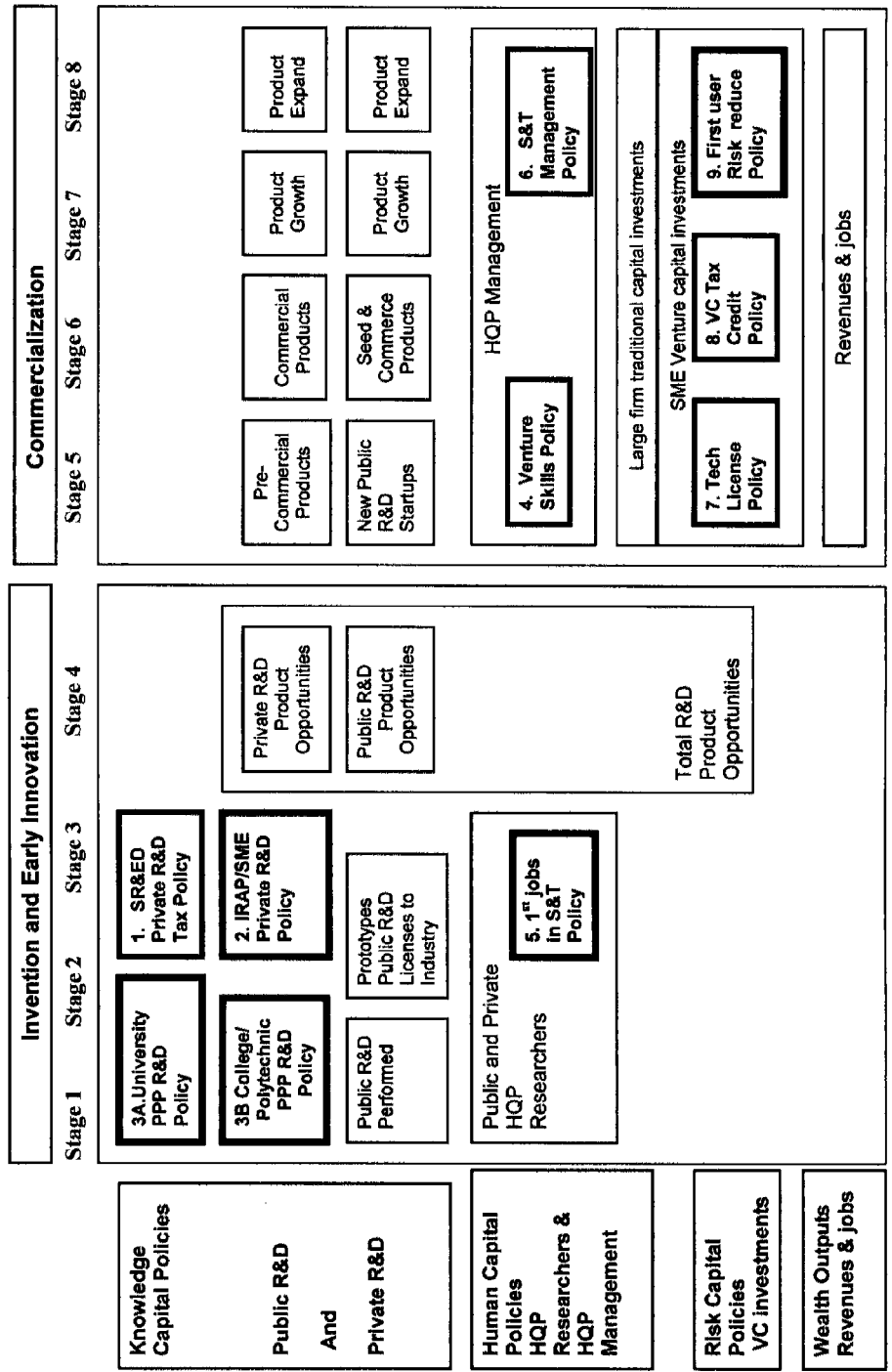
FIG. 8C shows the mapping of these example policies within the stages of the supply chain at the second level of approximation for public R&D and private R&D, HQP and risk capital.

Several types of policy operations within the policy Layer IV in FIG. 1 may be applied to address these differences between the desired benchmark settings and the settings existing in each jurisdiction. The policy operations may be characterized by broad types of technology policies as illustrated in FIG. 8A.

In one embodiment, three broad types of technology policy operations that are described by Lipsey R., Carlaw, K. and Becker in their 2005 General Purpose Technology Policy are applied to the assets: (i) framework policies that provide broad encouragement with single instruments; (ii) blanket policies that address a broad based single need with multiple instruments, and (iii) focused policies that address a specific market failure or defined local need with single instruments.

At the second level of approximation, policy operation application may be at national, state, provincial and industry sector aggregates, although each jurisdiction will have its own best values for these aggregates. For example, the firms in a jurisdiction that is specialized in resource industries will have to innovate as do all firms, but they will need less R&D than the firms in a jurisdiction that is on the cutting edge of developing such new technologies as biotechnology and nanotechnology and much more resource related R&D may be devoted to new production processes than to new products.

An assumption within the method is the benchmarks and relationships used to guide policy operations are more than descriptions. They have behavioural implications such that if jurisdiction X is more innovative and has a higher ratio of indicator A/indicator B than does jurisdiction Y, moving Y's ratio towards X's will move its innovative behaviour and production of economic value towards that of X.

In one embodiment, three examples, one for each type of policy, may be illustrated for policy operations related to knowledge capital and R&D as illustrated in FIG. 8A. Most jurisdictions apply framework policies that broadly encourage all companies to increase their levels of private research. In Canada a Scientific Research and Experimental Development (SR&ED) instrument provides a 20% tax credit against otherwise payable tax for large firms or 35% cash back of R&D expenditures for smaller firms. Blanket policies may be specifically targeted at increasing the private R&D capability and receptor capacity of small and medium enterprises such as via the National Research Council Industrial Research Assistance Program (IRAP) in Canada or via the Small Business Innovation Research (SBIR) programs in the US, which co-invest with selected SMEs to conduct R&D. A focused policy may foster partnering on ideas prior to public research to increase local relevance for commercialization of research results in a particular jurisdiction, sector or cluster. Best results are often achieved via a mix of types of policies.

Examples of policy operations may be illustrated for each type of asset and the related innovative capacity driver(s)—public R&D, private R&D, HQP (researchers), HQP (management) and risk capital—also as illustrated in FIG. 8A and within the supply chain architecture (as layer IV) in FIG. 8B.

The ideal benchmark setting that guides knowledge asset related policy operations is a private/public R&D ratio of 3/1, i.e. 0.75 private and 0.25 public. In 2000 the Canadian ratio was 1.35 and as a result, the Canadian R&D dollar was generating approximately 30% less in the way of new product opportunities than in the US and Finland having ratios of 2.7 and 2.46 respectively. To increase Canadian innovative capacity and economic value growth, a mix of types of knowledge policy operations may be applied including: (i) Framework Policies aimed at markedly increasing levels of private R&D performance, and (ii) Blanket Policies including R&D incentives to enhance SME receptor capacity development.

Each dollar of public R&D planned in partnership with industry may provide up to 15 times the level of product opportunity outcomes and innovative capacity value of an equivalent public R&D dollar that has no industry partnership. Two example blanket and/or focused policy operation examples to increase economic value are: (i) sustained investment of 5%, as for Benchmark 2, of public R&D levels for public/private partnership relationships with universities, colleges and polytechnics to increase locally commercially relevant R&D in public R&D institutions; and (ii) incentives for increased industry investment in public R&D with these types of public institutions.

It is important to generate sufficient levels of HQP from the educational and public R&D system and to ensure their transfer to industry to create economic value. For example, the level of Canadian HQP (researchers) in 1987 was 4.5/1000, greater than Finland's of 4.1/1000, however Canadian HQP advanced very slowly to 6.4 in 2001, an increase of only 42%, while in Finland the level rose 285% to 15.8 or more than 6-1/2 times the rate of change in Canada during the same period. Low levels of workforce HQP limit growth in private R&D, product opportunity yield, access to risk capital and innovative capacity and economic value. Since private R&D and HQP are highly interdependent, their policy operations need to be aligned. Examples may include a framework policy such as an industry incentive to augment the rate of increase of HQP uptake in the workforce in concert with increasing private/public R&D; a blanket policy such as incentives for selected SMEs to increase their levels of HQP, including first jobs in science and technology (S&T) for building receptor capacity, and focused policy incentives for the venture investment industry to increase the quality and level of HQP management in firms in concert with investments.

Static or declining levels of product opportunities and low levels of HQP in the workforce will constrain the number of investment opportunities and risk financings. Policy operations that seek to raise levels of venture capital investment must also concurrently raise HQP and private R&D to generate greater yield of well packaged and well managed investment opportunities, for example by (i) framework policy incentives to increase investment in venture capital that are related to incentives to increase the flow in the number product opportunities; (ii) blanket policy incentives for investment in early stage pre-seed (angel) and seed investment for SMEs that incorporate angel expertise and mentoring, and/or (iii) focused policy investment incentives to share risk in demonstration and pre-commercial pilot introduction of new products and technologies.

In the example in FIG. 7 (Column 12), Canadian innovative capacity competitiveness declined from 12 to 9. The Canadian index is approximately one seventh of the U.S. index and one tenth of the Finish that doubled during the same 1997-2002 period from 46 to 96. Put another way, the Finnish innovative capacity competitiveness value is advancing approximately 10 times faster year over year compared to Canada. Innovative capacity policy operation targets should relate to a combination of the private/public R&D benchmark of 3, the HQP benchmark of 10 and hence an innovative capacity index target of 90 or greater. This index provides a good guide for measuring the combined effectiveness of the policy operations package for knowledge policies, HQP policies, and access to capital policies, in relation to comparative competitiveness and the potential for economic value creation compared to other jurisdictions. Attempting to derive an assessment of optimal economic value just from increases in public R&D and private R&D is misleading and fails to understand the interdependence of the drivers within the innovative capacity relationship as taught by this invention.

In one embodiment, a set of 3 policy operations, one for each type of policy for each of the 3 types of assets (R&D, HQP and risk capital) are illustrated in FIG. 9A for a Canadian province, British Columbia, but may also be applied to nations, provinces, states and industry sectors according to the method.

In this example, the initial settings for the assets in British Columbia during the period 1997'98-2002'03 in FIG. 9A include: (i) $867 million of public R&D which would generate 867/22.5=39 product opportunities; and $979 million of private R&D would generate 979/1.5=653 product opportunities for a total of 39+653=692 product opportunities; (iii) HQP (researchers) 6.2/1000 and (iv) Risk capital $107 million. The private/public R&D ratio was therefore 1.13.

To achieve the desired benchmark settings, policy operations should produce increases in the existing asset settings of 166% in private R&D to $1622 million to achieve a private/public R&D ratio of 3/1 for public R&D of $867 million; a 73% increase in HQP (researchers) to reach 10/1000; and a resulting increase of 156% in product opportunities accompanied by an equivalent increase in the risk capital asset.

Figure 9B:
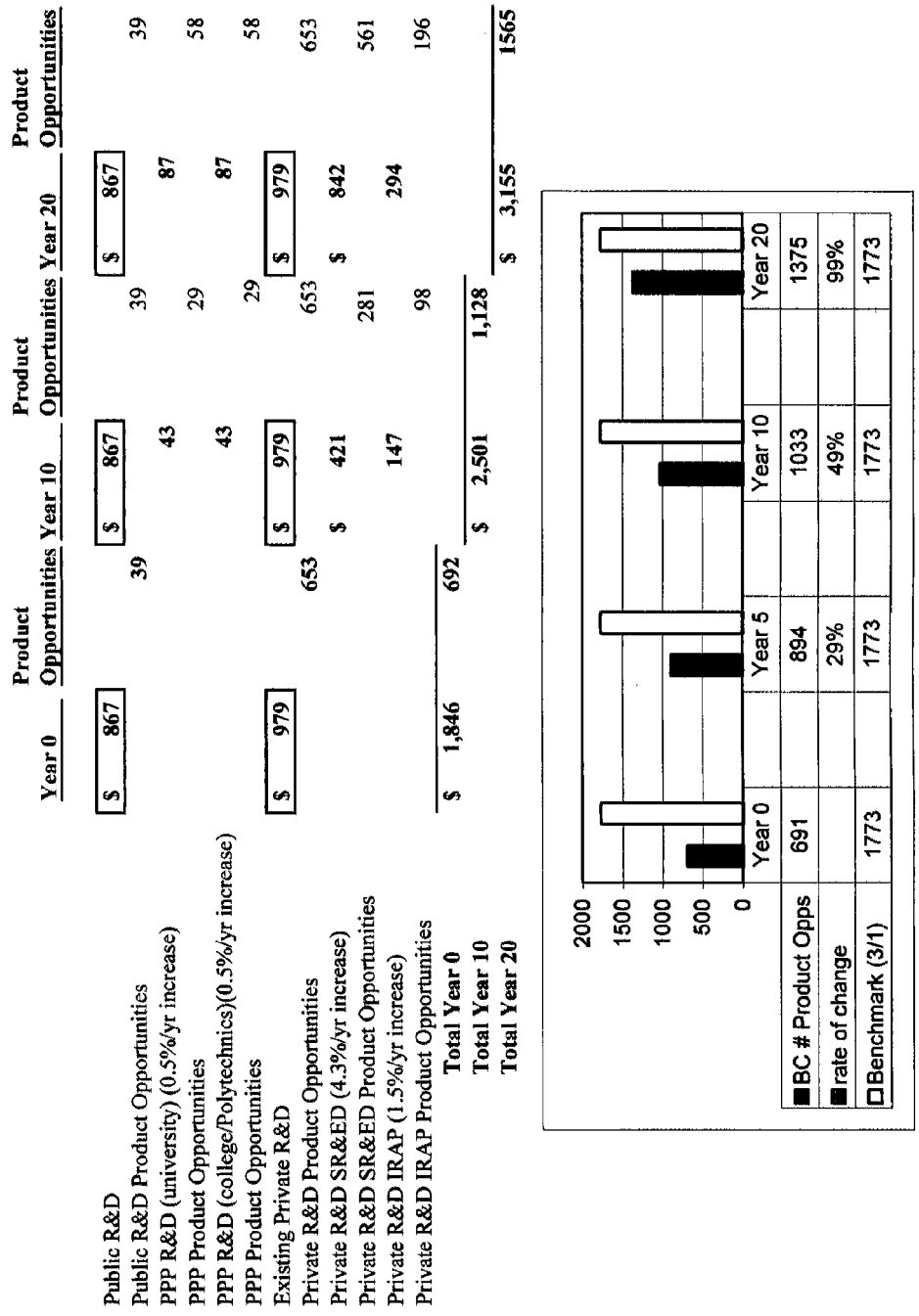
FIG. 9B shows one example of the application of the policy operations for increasing private R&D and private/public partnership (PPP) R&D and the resultant levels of product opportunities that are calculated to be produced based upon North America model levels.

Policy operation rates of change applied in the example in FIG. 9B are between 1% and 5% per year to produce increases in both product opportunities and risk capital of 29%, 49% and 99%, in HQP of 50%, 100% and 150% and in risk capital of 29%, 49% and 99% by years 5, 10 and 20 respectively. Additional "what-if" policy operation investment scenarios may be applied at differing rates of change to minimize the difference between the outcomes and the benchmark settings.

Different policy operations and public investments in assets have different degrees of influence on change in asset settings and economic value produced. These rates of influence are often much greater than a one-to-one investment ratio. For example, a 20% tax incentive to industry based on private R&D performed may produce a 5/1 leverage whereas a 35% tax incentive would produce a 3/1 leverage on public investment in R&D. These degrees of influence both as they relate to (i) the level of policy operation intervention required to achieve the benchmark settings as well as (ii) the investment cost of the policy operation, both play a role in setting priorities for selection of optimal sets of policy operations that may be tested in the "what-if" scenarios.

Figure 11:
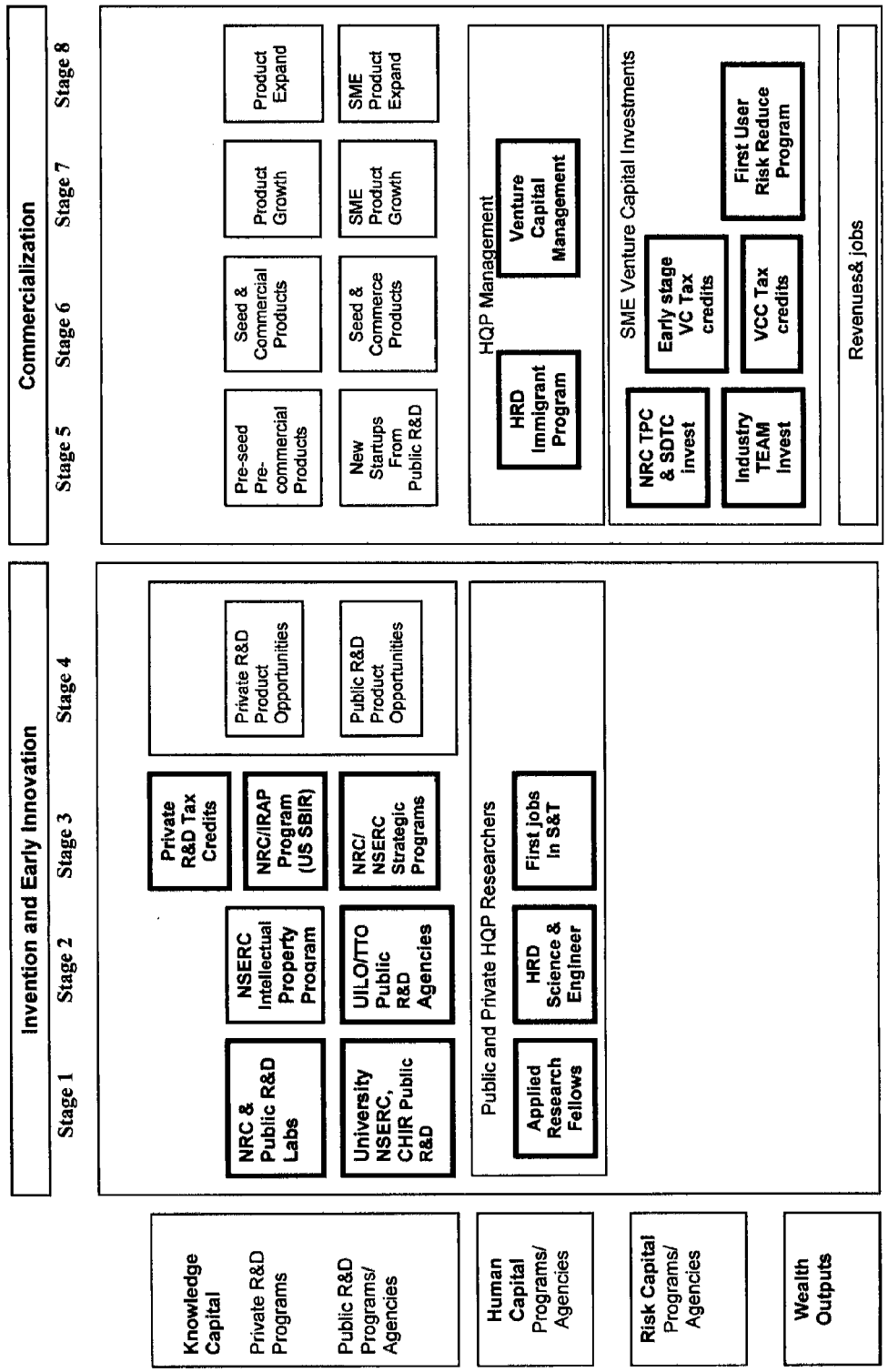
FIG. 11A shows Canadian examples of policy operation implementation programs and agencies in Layer V of the second level of approximation for each stage in the process. One example of a Canadian agency program—the National Research Small Business Industrial Research (SBIR) program is circled in the earlier portion of the process and another, Technology Early Action Measures (TEAM) within the Canadian energy industry sector is circled in the early risk capital investment stages of the layer portion of the process.

Examples of types of programs and agencies that implement the policy operations (FIG. 8B) may also be mapped on the supply chain architecture as layer V at this second level of approximation as illustrated in FIG. 11A. This database may include programs and agencies in different nations, states, provinces and sectors. The examples in FIG. 11A relate to programs and agencies in Canada and are recorded in the historian. Policy operations and associated investments may then be attributed to each program or policy agency and the proportion of innovative capacity and economic value created may also be attributed accordingly and monitored over time.

An example of the policy contribution of the Canadian National Research Council Industrial Research Assistance Program (NRC/IRAP) to SME private R&D in the early innovation portion of the supply chain is circled in FIG. 11A. Another example of the Canadian Technology Early Action Measures (TEAM) program that provides early risk investment in the later commercialization portion of the supply chain for the national energy industry sector is also circled in FIG. 11A. In both cases the attribution of asset investments in these policy operation programs may be determined in terms of product opportunities and number of risk investments as indicators of innovative capacity and economic value outputs over periods of time.

Figure 10C:
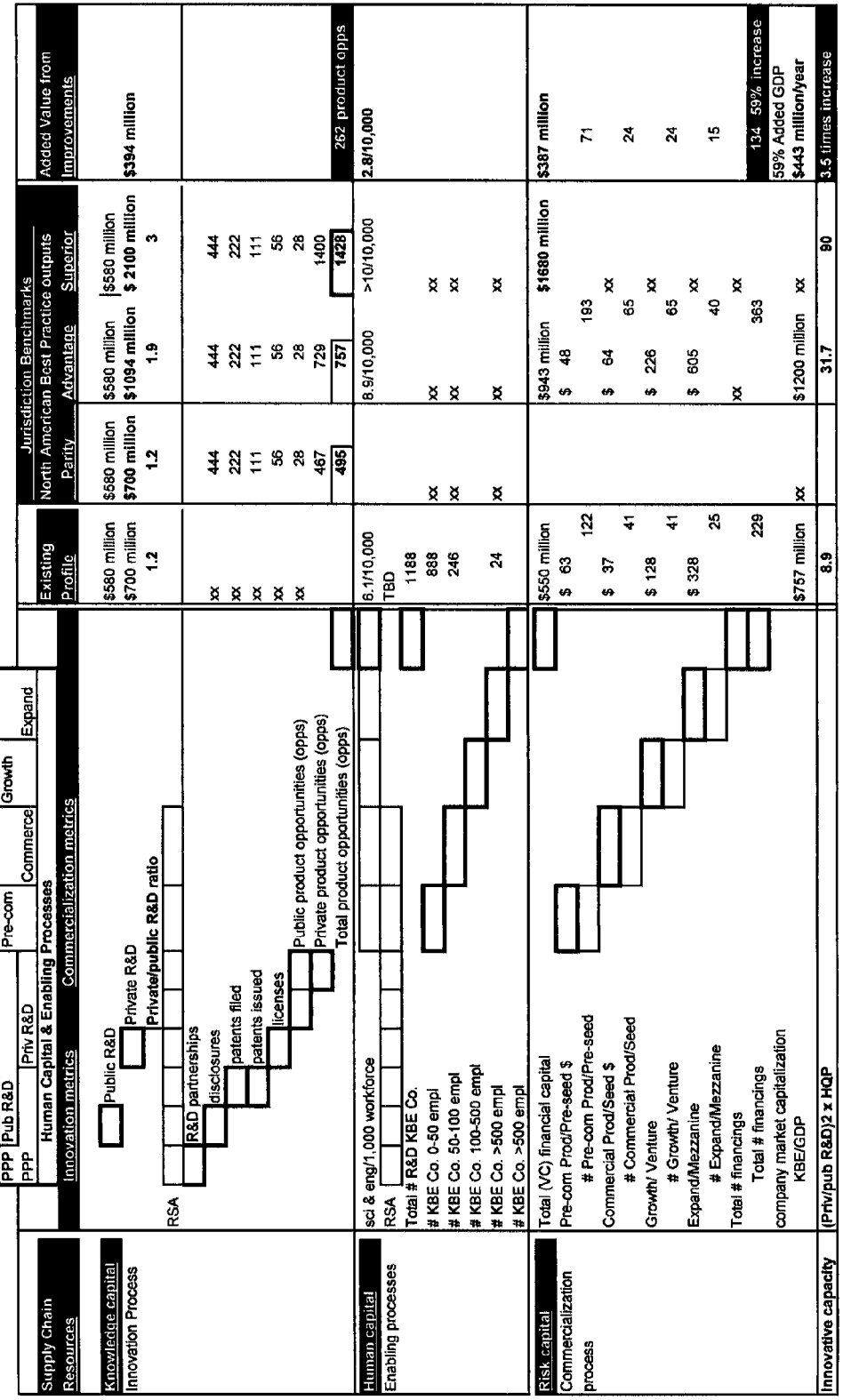
FIG. 10A consisting of PART I on the one sheet and a continuing PART II on a second sheet is an example representation of a policy operations performance measurement and monitoring scorecard for indicator performance measures for examples of application f the policy operation in FIG. 8B of the process in Layer VI of the second and third levels of approximation.
FIG. 10B is a comparative assessment of the outcomes and added value produced by the policy operations.

The initial asset settings, the policy operation asset investment settings, and the operational data, both calculated and observed in time, are recorded in a database or historian "scorecard", similar in concept to that in the prior art of the international Supply Chain Council illustrated in FIG. 10. The historian serves for (i) monitoring and measuring the effectiveness of the policy operations and related program and agency investments in moving the current asset settings towards the desired benchmark settings and (ii) calculating and measuring, where feasible, the increases in product opportunities, HQP, numbers of risk investments and increases in innovative capacity value as taught in this invention. Measures of increases in new product revenues, jobs and gross domestic product related to the product opportunities may also be monitored and reported as increases in economic value.

The aggregate model at this second level of approximation is capable of accurately analyzing the value for the key driver base asset components in the innovation and commercialization process. In theory, once the value of each asset component at each stage or sub-stage is modeled, they may be aggrandized to a larger asset set within the sub-processes and then the overall innovation and commercialization process. This may be done by mathematically combining the component assets into larger asset sets. However, such a recombination is not trivial. It involves effective application of knowledge of the innovation and commercialization system, the interdependencies of the drivers as described in the method as illustrated in the FIGS. 4, 5 and 6, and is dependent upon the manner in which the component assets are combined. The complexity of accomplishing this generally makes this approach impractical. A close investigation of this bottom-up approach also reveals that determining innovative capacity or economic value at the base asset component level is often meaningless because economic profit points often do not occur at each component asset point in a process. However attribution of the effect of policy operations and program investments on innovative capacity value at the larger asset second level of approximation as well as at a more detailed third level of approximation for nations, states, provinces and industry sectors may be made.

Figure 12A:
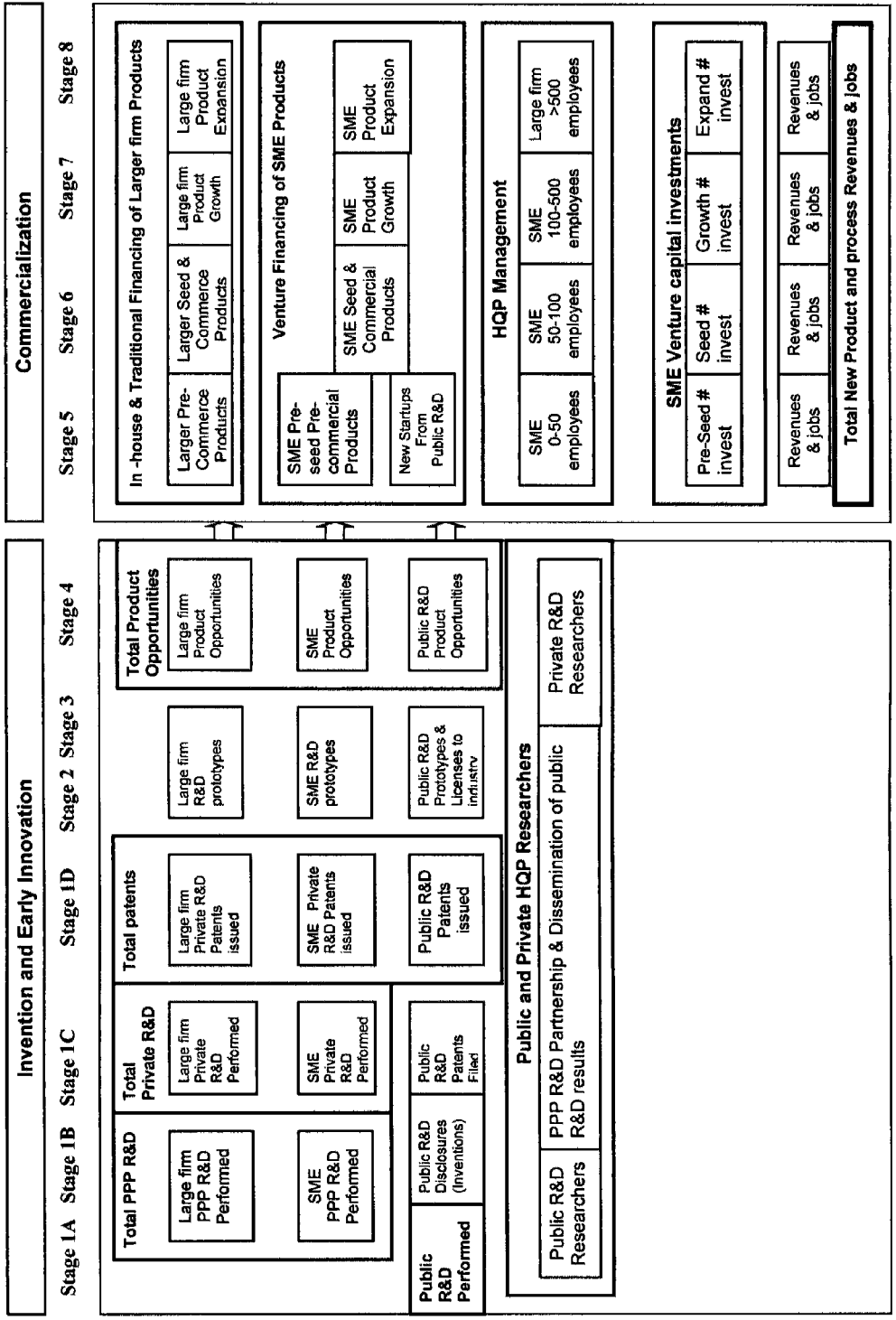
FIG. 12A shows an example of layer I of a third level of approximation of the supply chain that includes: (a) the university portion of the public R&D that has sub-stages including R&D invention disclosures, patents filed, patents issued, licenses to industry, product opportunities and start-ups; (b) the Small and Medium Enterprise (SME) stages 5-8 and venture capital investment sub-stages as well as the larger firm stages and traditional capital investments; and (c) sub-stages 5-8 for HQP relating to public R&D, PPP R&D and results dissemination, private R&D, and sub-stages of firm employee size at the 0-50, 50-100, 100-500 and >500 employee ranges.

FIG. 1, illustrates only three of "N" levels of approximation, the first two of which have been described above. In a further embodiment, illustrated in FIG. 12A, at the third level of approximation, additional more detailed supply chain stages and sub-stages are defined for: (i) the higher education R&D (HERD) portion of public R&D; (ii) the R&D and commercialization stages for smaller enterprise SMEs and for larger firms; and (iii) revenues and jobs for each of the four commercialization stages.

Figure 12B:
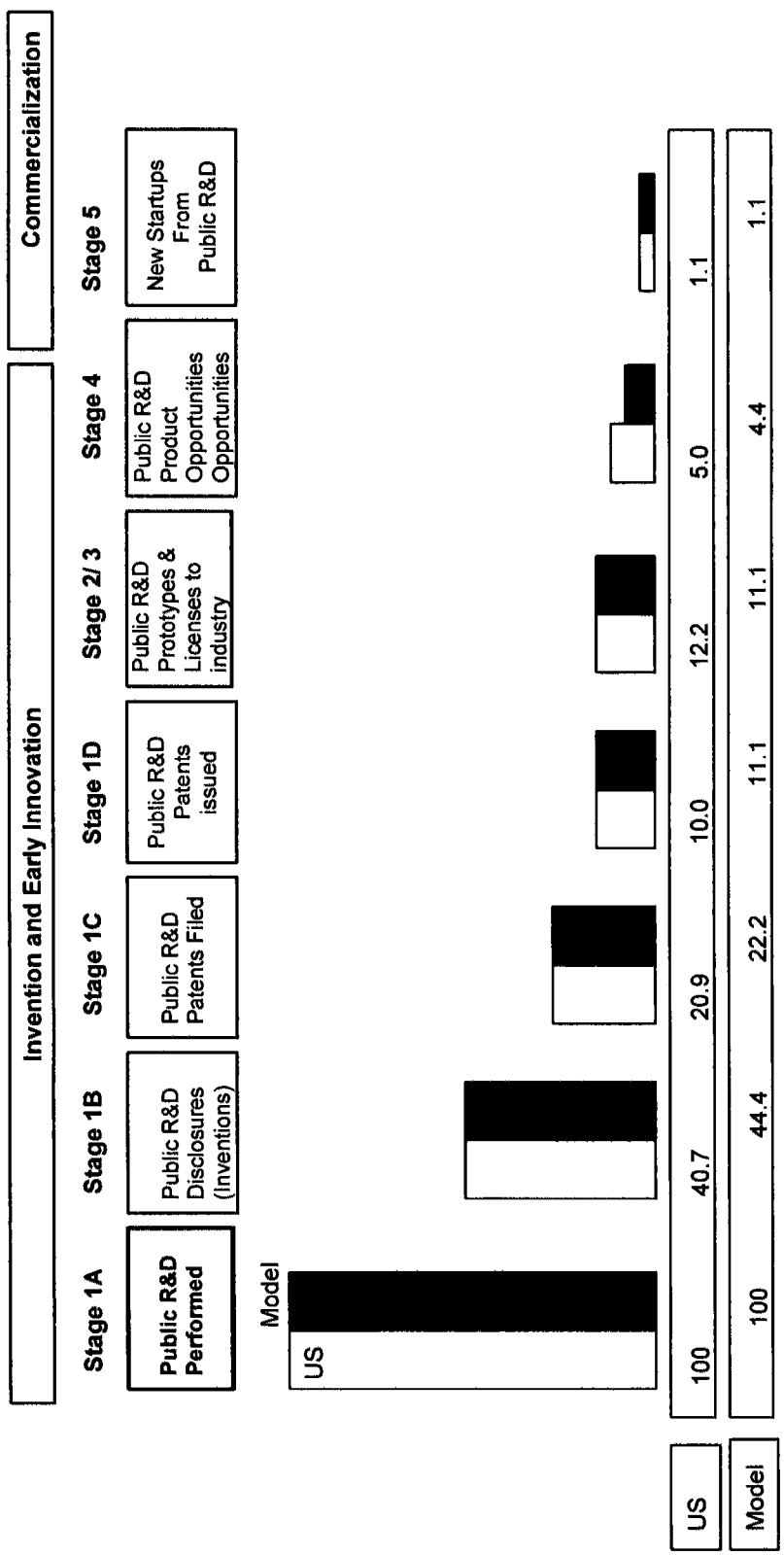
FIG. 12B then provides a histogram example of North American university public R&D yield for each sub-stage 1A-1D and 2-5 and a second histogram for outcomes for stage 2 and 3 for private R&D.

Indicators of success in the early stages of the innovation supply chain are shown in FIG. 12B for university public R&D. The yield of inventions, patents, proofs of concept and prototypes, which may collectively be termed progressive interim outputs, is approximately 50% at each successive step in the R&D portion of the process. Based upon AUTM data for public R&D interim outputs, # inventions (disclosures)=$ (million) R&D/2.25; # patents filed=$inventions/2; # patents issued=patents filed/2; # licenses with industry=# patents issued; # of product opportunities=#licenses/1.5 and # spin-offs=$(million) R&D/22.5.

Figure 12C:
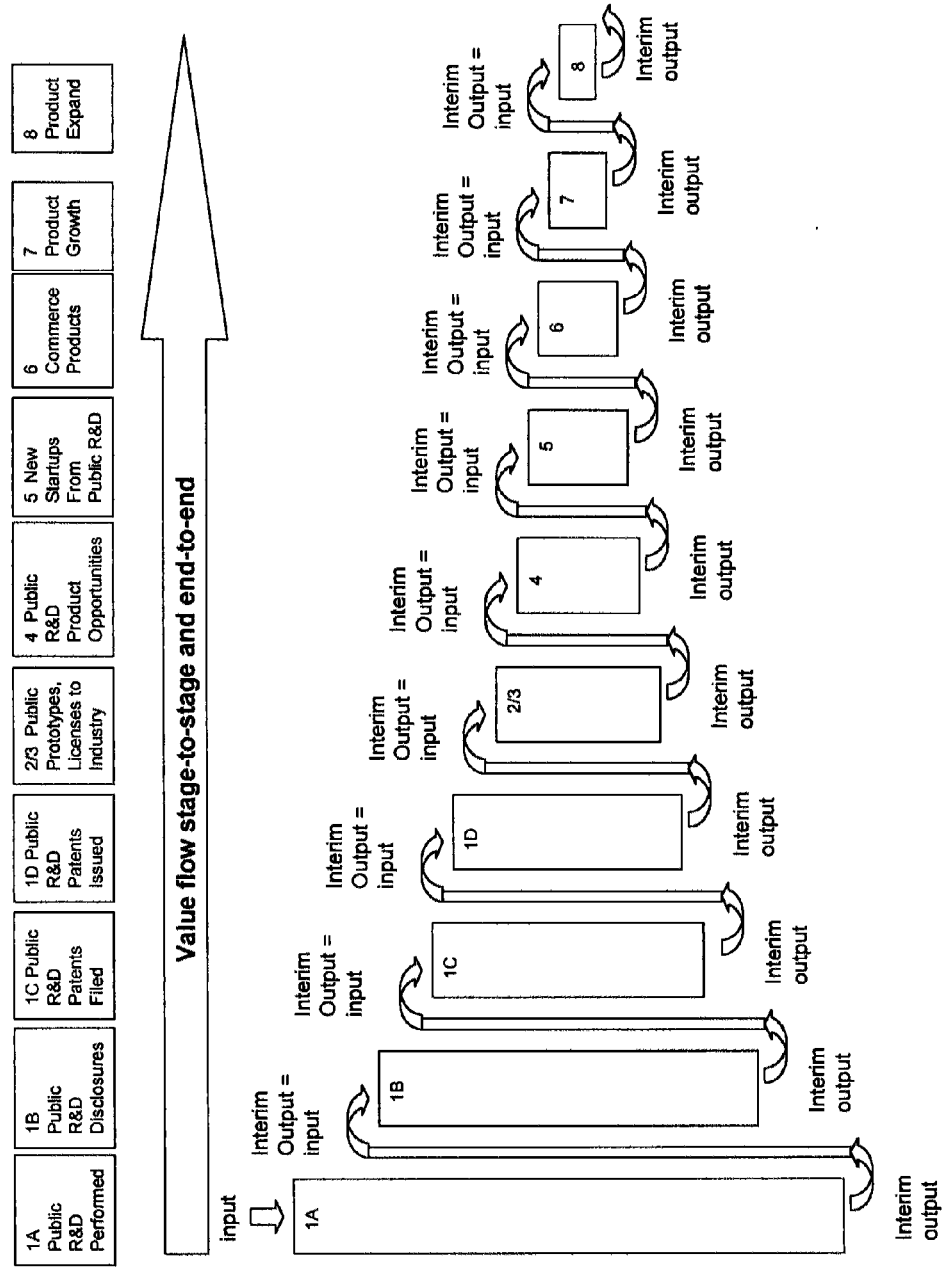
FIG. 12C shows indicator performance measures (IPM) for the linked sets of inputs and outputs for each of the sub-stages in the university portion of public R&D within the supply chain by aligning FIG. 12B with FIG. 12A.

The main general point is that the yield of successful outputs gets smaller and smaller as we move towards generating wealth in the market place and the progressive yield can be measured. In one embodiment, a set of linked input/output "indicator performance measures" (IPM) for the university R&D portion of public R&D as described above may be illustrated in FIG. 12C. The IPMs are involved in the rule sets in Layer 2 for the third level of approximation.

Transfer of the results of public R&D to industry for commercialization, usually by licenses of patented technology, is important for wealth creation. Where a start-up company is formed rather than a license being provided to existing industry, the number of start-ups is approximately one for each $22.5 million or in the order of 4%-5% of the number of dollars of public R&D performed at universities in Canada but a little lower in the US. The number of product opportunities pursued by industry resulting from these licenses in stage 4 is also in the order of one for each $22.5 million of public R&D.

Venture capitalists are an important source of funds for the formation and expansion of small high technology companies (SMEs). However the larger companies, who conduct approximately 70% of total private R&D, often use internal funds or more traditional sources of financing for commercialization. Both are identified in the commercialization portion of the supply chain at the third level of approximation. As noted previously and illustrated in FIG. 12B, 75% percent of the number of venture investments in SMEs are at the first two stages combined, 17% are at the growth stage and 4% are at the expansion stage both for the US and Canada.

There are many more failures in the early stages of commercialization than in the later stages. Not all companies follow each of the financing stages in succession and the amounts of financing vary but may be generally characterized by stage. Only about 20% and 40% of pre-commercial and commercial products at stages 5 and 6 in FIG. 12B respectively go on to produce wealth for the company and the investor. In the latter stages—stage 7 and 8, the risk becomes progressively lower approximating 60% and 90% product success respectively at the growth and expand stages. Thus, the degree of success in terms of the potential to generate product revenues gets higher as products get closer to market and as companies generally mature and get larger.

Figure 13A:
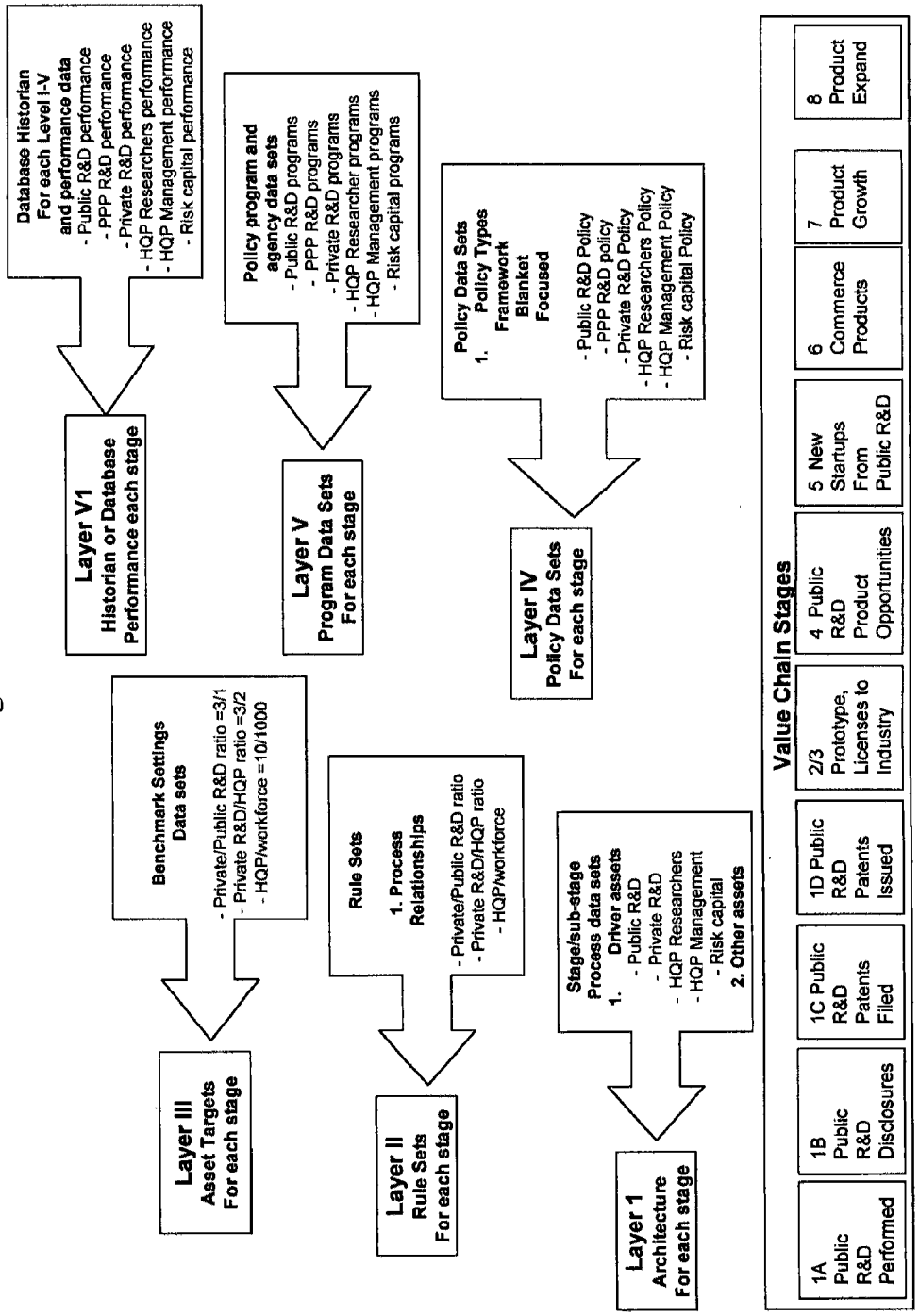
FIG. 13A is a representation of the database historian in Layer VI that is comprised of data sets for each of the layers I-V at each of the levels of approximation.
Figure 13B:
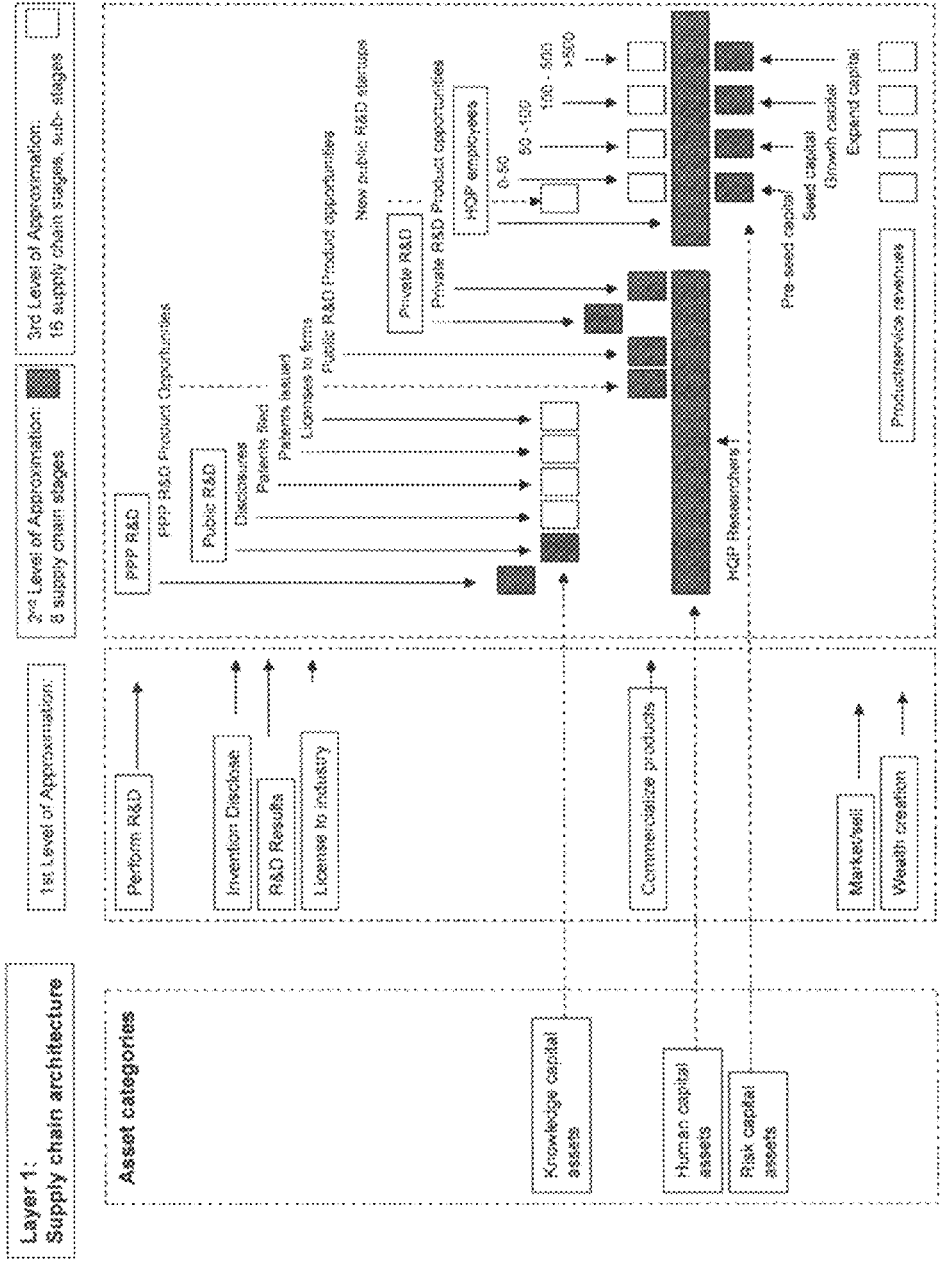
FIG. 13B shows examples of asset categories and types of assets in each stage in each of the first, second and third levels of approximation in Layer I of the supply chain architecture.
Figure 13C:
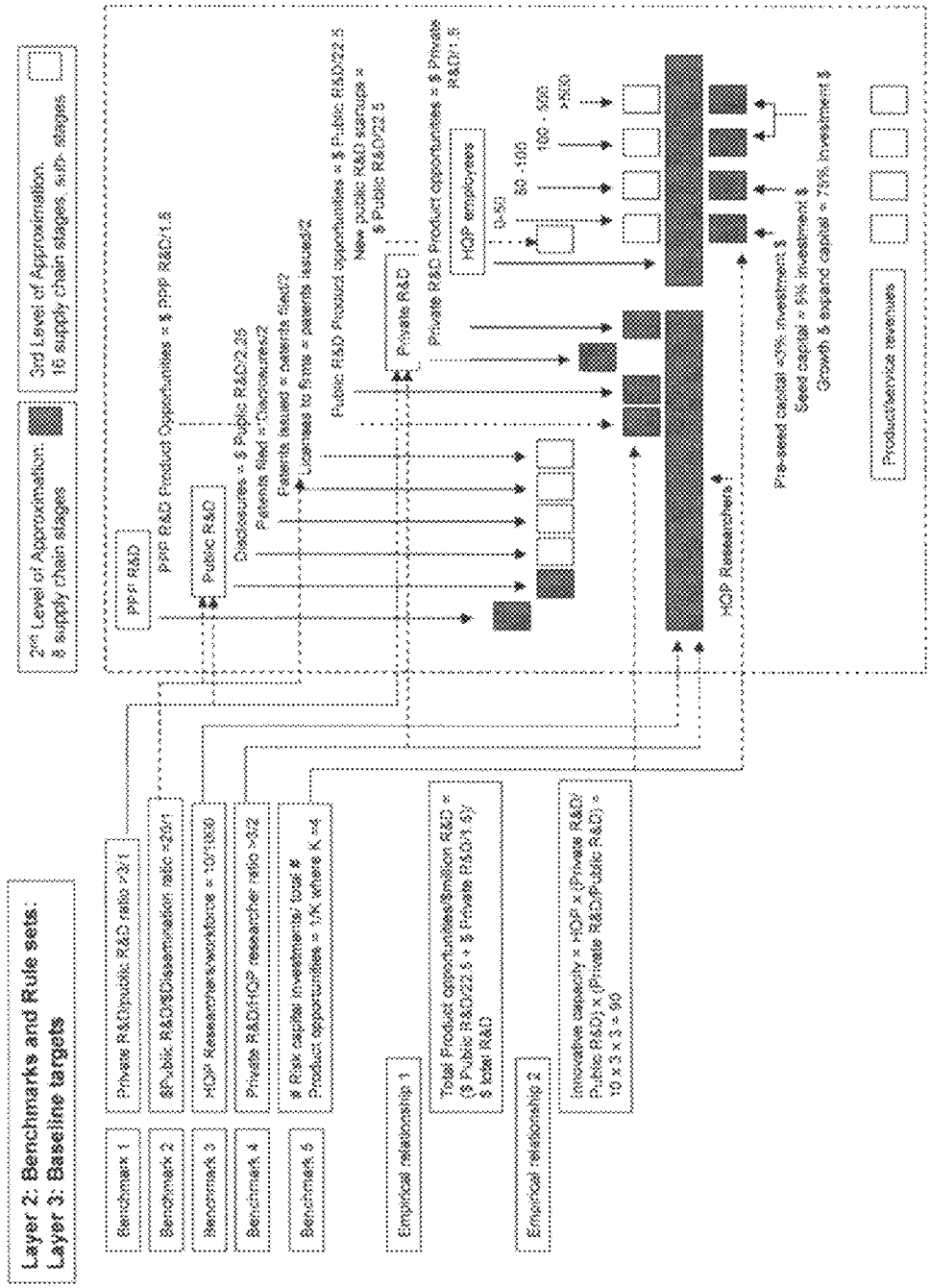
FIG. 13C shows examples of the rules sets (Layer II) and related data sets for the benchmarks (Layer III) for the second and third levels of approximation.

Examples of each of the three levels of approximation in Layer 1 of the supply chain architecture as illustrated in FIG. 1 have been described. At the second level of approximation examples of each of the Layers II-V have also been described: Layer I (FIG. 13A)—stages in the supply chain architecture; Layer 2 (FIG. 13B)—rule sets and asset relationships; Layer 3 (also FIG. 13B)—benchmark asset settings; Layer 4 (FIG. 13C)—policy operations; Layer V (FIG. 13D)—Policy implementation programs and agencies; and Layer VI (FIG. 13E)—the data set historian for all indicator performance measures (IPMs) and data sets.

The method in this invention takes a systems view that comprises sets of databases related to both public, including government and academe, and business processes and their sub-processes that integrate together. The data taxonomy in the historian classifies the databases in ordered groups according to their process relationships. The database historian and data containers related to each layer in the process historian within the supply chain architecture is illustrated in FIG. 13E. As progressive levels of approximation are detailed and assessed, additional indicator performance measures and data sets are added to the process database and historian.

Figure 14A:
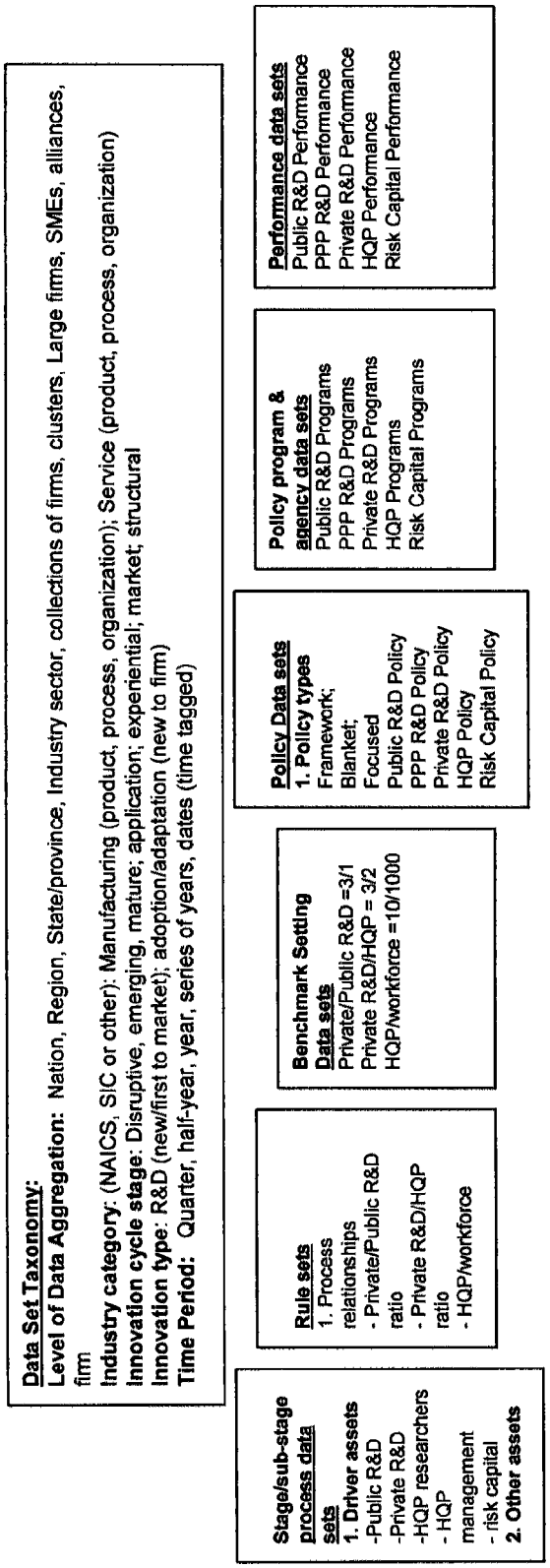
FIG. 14 is an illustration of the data taxonomy in Layer VI and a flow diagram of the steps in the method that may be used for monitoring economic value generated by different policy operation application rates of different sets of assets shown in FIG. 13A, according to relationships expressed in a model of the current invention.
Figure 14B:
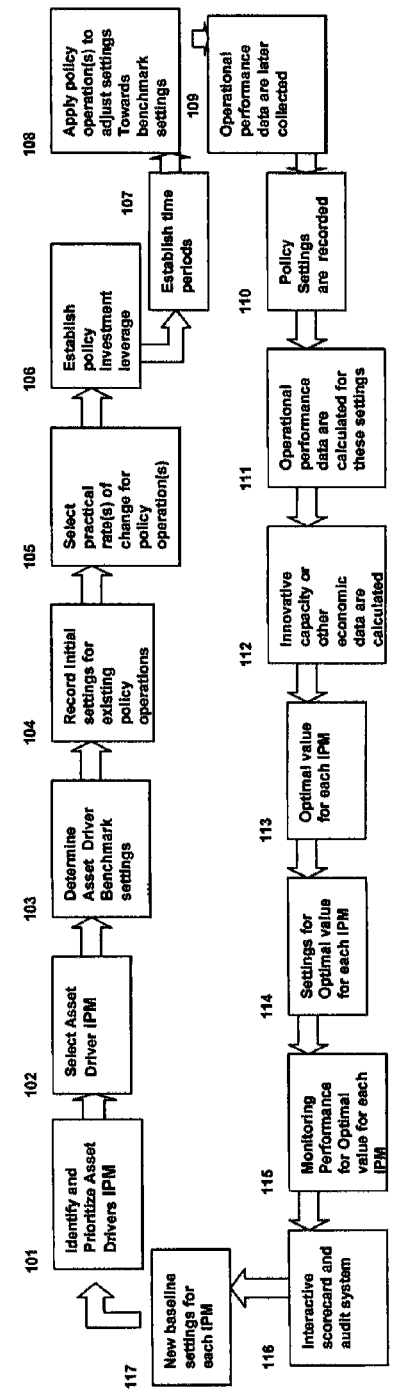
Figure 15:
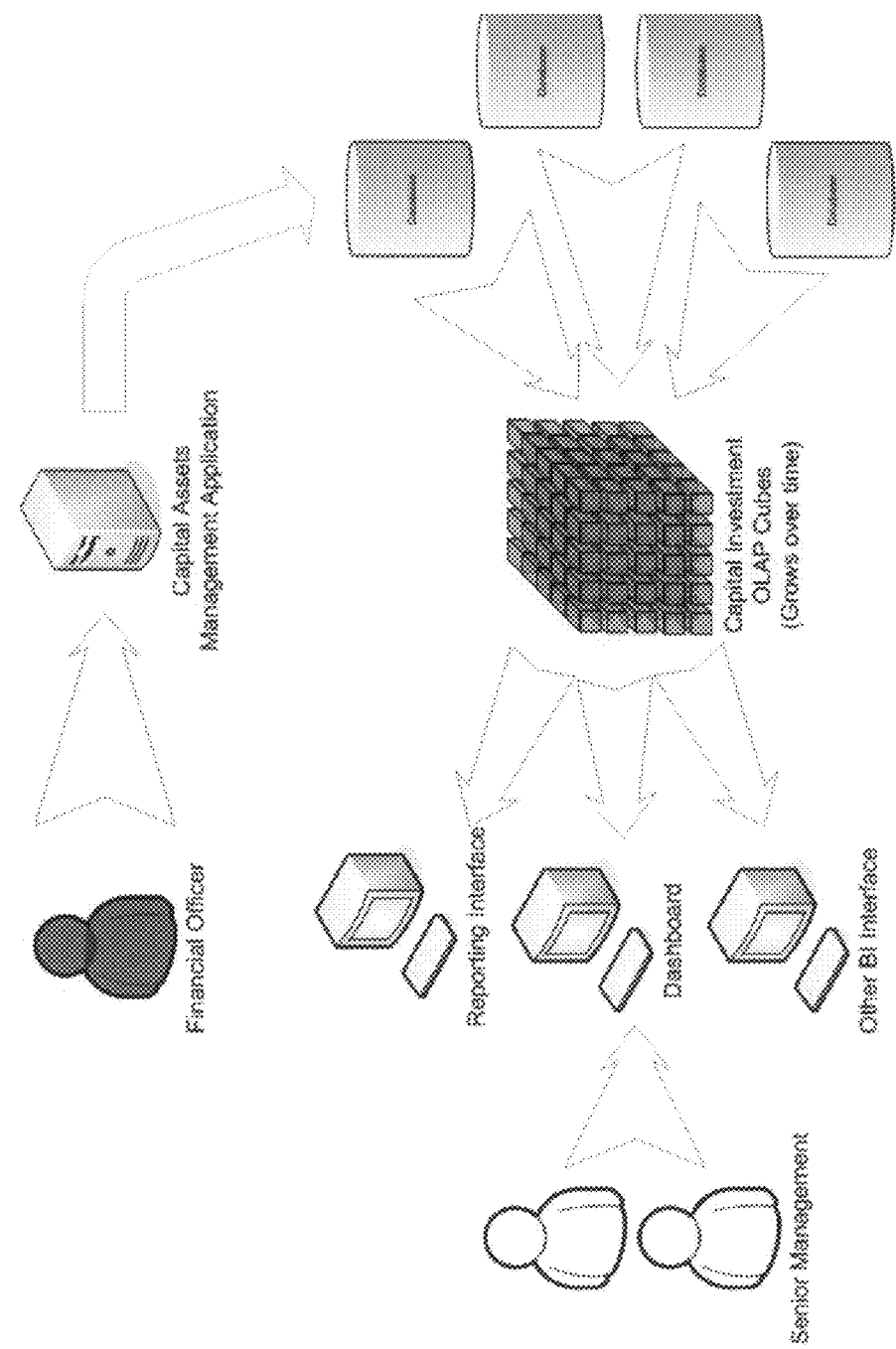
FIG. 15 shows an example implementation system using OLAP for the process.

The analyses within the method are performed for aggregates of assets of interest over time periods of interest. The steps of this analysis are shown in the flowchart of FIG. 14. For a time period of interest, indicator performance measures (IPM) are identified and prioritized (step 101). A high priority IPM is then selected as the initial IPM of interest (step 102), and benchmark settings (step 103) as well as initial settings for the existing policy operations are recorded (step 104). Practical rates of change for policy operations are determined based on past policy or other experience (step 105). Policy operations are selected with ranges of suitable investment leverage (step 106) for application over selected time periods (step 107). They are then performed on the assets according to the initial base settings, with setting sets that differ from the base settings to move the initial settings towards the benchmark settings. For the selected policy operations and the assets under analysis, operational performance data is calculated and if feasible later collected for the assets at selected intervals of time (step 109) and no less than annually. The settings of the asset or assets that resulted in the calculated data are recorded at the same intervals of time (step 110). The calculated performance data will vary over time as changes are made to the settings, or operating parameters, of the assets. For each calculated or collected unit of operational performance data, a corresponding unit of innovative capacity and/or other economic performance data is calculated (step 112). One or more units of innovative capacity and/or economic performance data may be grouped into a given economic performance measure, such as but not limited to product and process opportunities, product revenues, new jobs and so forth. Each resultant economic performance measure is one of the IPMs in one of the three levels of approximation. Each IPM thus varies over the time period of interest as the settings of the assets, and thus the calculated performance data and the innovative capacity and/or economic performance data, are changed. All of this data is placed in the process historian and related by time, resulting in a time-stamped database or table of the data.

For the time period of interest, for each IPM, the optimal value determined by that IPM during the time period of interest is identified (step 113) by analyzing various sets of policy operations for the IPM. The optimal value may be a maximum value or some other value, depending on the IPM, its inter-relationship with other IPMs and the economic goals for the assets being analyzed. The settings of the assets that led to that optimal value for the IPM are then identified (step 114). These data and operational performance data are all monitored (step 115) and available in real-time in an interactive scorecard and audit system (step 116). In a subsequent period, these settings are, as steps 113-116 indicate, adopted as the base settings, and steps 104-112 are repeated if further IPM optimization is desired.

As the analysis is repeated in subsequent periods for respective IPMs of interest, some of the settings change. However, no significant changes are permitted in settings to which changes would adversely affect the value of one ore more of the higher-priority IPMs and their benchmark driver relationships. Such settings may often be identified a priori, by analyzing the system and the desired benchmark settings, while others become apparent as a result of trial and error. So, some of the settings determined from each iteration as a result of trial and error. So, some of the settings determined from each iteration will remain unchanged over all include a group of some settings unchanged from the results of the first iteration, and another group of settings that also may not be changed during successive iterations. This other group of settings includes those settings that, if changed, would impact the optimal value of the other high priority IPMs. Thus, with each successive iteration the number of settings that may be changed may decrease. This will result in a group of settings that should produce optimal values for each IPM of interest over time recognizing that these optimal values will also change over time in dynamic economics. Of course, this process may be implemented in a computer system, using hardware, software, or a combination of hardware and software.

The mathematical models, the relationships expressed therein, and the analysis performed on the data indicate optimal operating practices in a very quantitative manner. The deficiency of this approach is that the models and analysis are based on historical information. Operating conditions frequently change over time, as economics are very dynamic however historical data should present a close approximation of current operations.

The calculation of increases in innovative capacity and economic value generated over baseline operations for a period of time may be very useful in assessing the economic return of improvements resulting from a more optimal innovation and commercialization process or a set of improvement policies, investments and activities as defined by changes in the settings of the assets. Although the concept of economic return on investment is commonly discussed for policy operations, it is seldom directly calculated. The teachings in this invention provide a mechanism for the direct calculation of innovative capacity and economic return on investment. This calculation may also be utilized to normalize the positive or negative effects of subsequent policy actions or activities from the activity under analysis.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor including volatile and non-volatile memory and/or storage elements, one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an interest and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single or multiple processor/devices.

The device(s) or computer systems that integrate with the processor(s) may include, for example, a personal computer (s), workstation (e.g., Sun, HP), personal digital assistant (PDA), handheld device such as cellular telephone, laptop, handheld, or another device capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus may be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or is a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or otherwise network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet References herein to microprocessor instructions or microprocessor-executable instructions, in accordance with the above, may be understood to include programmable hardware.

Unless otherwise stated, use of word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art. Accordingly, it will be understood that the disclosed methods and systems are not to be limited to the embodiments disclosed herein, may include practices otherwise than specifically described, and are to be interpreted as broadly as allowed under the law.

What is claimed is:

1. A method of using a computing system for transforming combinations of knowledge, human and capital input assets via a series of linked supply chain process steps to produce different interim and final output articles within the supply chain in proportions that optimizes innovative capacity and economic value, the method comprising one or more steps:
   (a) wherein the computing system comprising a computer processor and a research investment database transforms financial investments in public research and development and/or private research and development to inventions, inventions to patents, patents to proofs of concept, proofs of concept to prototypes, combinations of these prototypes, proofs of concept, patents and/or inventions to new product and process opportunities, new product and process opportunities to new products or processes, and these new products or processes to new economic value;
   (b) wherein the computing system comprising a computer processor and a research investment database transforms financial investments in the university and/or public research and development process supply chain according to a model of the transformation method where each successive linked step yields an output article approximately 50% the magnitude of the previous article and using data to quantify the yield for each article in the supply chain provided by the Association of University Technology Managers and/or the National Science Foundation of the United States of America;
   (c) wherein the computing system comprising a computer processor and a financial and human resource database transforms financial investments in the public research and development process to a number of well-educated researchers that are transferred to the local workforce and the private research and development process supply chain to increase innovative capacity in companies, in aggregates of companies and/or in jurisdictions;
   (d) wherein the computing system comprising a computer processor and a research database are used to determine interdependencies among public and private research and development processes in terms of optimal input balance among (i) financial investments in public research and development, (ii) financial investments in private research and development and (iii) the number of well-educated researcher assets in the local workforce that optimize innovative capacity;
   (e) wherein the computing system comprising a computer processor and a policy database are used to apply policy operations to public and private research and development supply chains to optimize the innovative capacity outputs of public and private research and development performers;
   (f) wherein the computing system comprising a computer processor and a performance measure database are used to prioritize performance measures for the articles in the supply chain to measure innovative capacity by performing, during a time period, a process that includes:
      (i) using a computing system comprising a computer processor for calculating and then using a computing system comprising a processor and a database for collecting and storing, as policy alteration operations are performed on the input assets, operational performance data about the assets and the asset settings and the series of successive supply chain interim output articles that produced the data;
      (ii) using a computing system comprising a computer processor and a database for calculating and storing, and if possible, modeling at least annually, innovative capacity and economic performance data from the collected operational data relating to these articles; and,
      (iii) using a computing system comprising a computer processor and a database for determining optimal innovative capacity by identifying the optimal benchmark value for each of the input assets, and optimal benchmark value driver ratios among combinations of the input assets over a period of time;
   (f) using a computing system comprising a computer processor and a policy database for determining, for each of a plurality of successive policy performance measures in order of decreasing influence in attaining the optimal value, the policy settings that will result in optimal innovative capacity and economic value from the assets for each measure, by repeating the above process with sets of policies that do not result in any further substantial change in the value of any high priority measure from its identified optimal value; and
   (h) using a computing system comprising a computer processor and a policy database for selection of sets of policies and associated input investments that adjust the resource asset allocations and contribute to optimization of innovative capacity and economic value for a public or private entity, jurisdiction or its economy and monitoring the results over time in relation to the extent of attainment of the desired benchmark values.

2. The method according to claim 1, further comprising a computing system wherein the computing system comprises a computer processor and database for: setting initial asset settings for the said policy alteration operations where the initial settings are the settings determined according to the process, and the process has been repeated for the plurality of successive policy measures and determining if policy alteration operations made to the initial asset settings result in further innovative capacity and optimal economic value being derived from the assets, by:
   (a) utilizing the computer processor and database for changing at least one of the initial settings;
   (b) utilizing the computer monitor graphical user interface for viewing the displayed measure over time to learn if the at least one changed setting has positively impacted the measure; and
   (c) if there is a positive impact on the measure, utilizing the computer processor for maintaining the at least one changed policy alteration operations, and
   (d) if not, utilizing the computer processor for returning the at least one changed setting to its initial setting.

3. The computing system method wherein the computing system comprises a computer processor and database according to claim 2, further comprising:
   (a) utilizing the computer processor and database for repeating the process for innovative capacity driver measures showing the highest performance and the plurality of successive measures to determine further policy and investment settings that improve performance;
   (b) utilizing the computer processor and database for comparing the further settings to the current settings to determine any differences between the current settings and the further settings; and
   (c) utilizing the computer processor and database for changing the current settings to the further settings if there are positive differences.

4. The computing system method wherein the computing system comprises a computer processor and database according to claim 1, wherein storing occurs in a process database or historian.

5. The computing system method wherein the computing system comprises a computer processor and database according to claim 4, wherein the process database or historian is part of a process control system, and collecting and calculating occur within the process control system.

6. A computer system wherein the computing system comprises a computer processor and a database configured to architect and display the steps and articles in research and development supply chains along with interdependency links among articles in them for transforming combinations of knowledge, human and capital input assets via a series of linked supply chain process steps to produce different interim and final output articles within the supply chain in proportions that optimize innovative capacity and economic value, the method comprising one or more steps:
   (a) wherein the computing system comprising a computer processor and a research investment database transforms financial investments in public research and development and/or private research and development to inventions, inventions to patents, patents to proofs of concept, proofs of concept to prototypes, combinations of these prototypes, proofs of concept, patents and/or inventions to new product and process opportunities new product and process opportunities to new products or processes, and these new products or processes to new economic value;
   (b) wherein the computing system comprising a computer processor and a research investment database transforms financial investments in the university and/or public research and development process supply chain according to a model of the transformation method where each successive linked step yields an output article approximately 50% the magnitude of the previous article and using data to quantify the yield for each article in the supply chain provided by the Association of University Technology Managers and/or the National Science Foundation of the United States of America;
   (c) wherein the computing system comprising a computer processor and a policy database are used to apply policy operations to public and private research and development supply chains to optimize the innovative capacity outputs of public and private research and development performers;
   (d) wherein the computing system comprising a computer processor and a performance measure database are used to prioritize performance measures for the articles in the supply chain to measure innovative capacity by performing, during a time period, a process that includes:
     (i) using a computing system comprising a computer processor for calculating and then using a computing system comprising a processor and a database for collecting and storing, as policy alteration operations are performed on the input assets, operational performance data about the assets and the asset settings and the series of successive supply chain interim output articles that produced the data;
     (ii) using a computing system comprising a computer processor and a database for calculating and storing, and if possible, modeling at least annually, innovative capacity and economic performance data from the collected operational data relating to these articles; and,
     (iii) using a computing system comprising a computer processor and a database for determining optimal innovative capacity by identifying the optimal benchmark value for each of the input assets, and optimal benchmark value driver ratios among combinations of the input assets over a period of time.

7. The computer system according to claim 6 wherein the computing system comprises a computer processor and database, further configured to:
   (a) use the computer processor to set initial investment settings for the policy operations, where the initial settings are the settings determined according to the process, and the process has been repeated for the plurality of successive measures;
   (b) use the computer monitor to display at least one of the performance measures and determine if changes made to the initial settings result in further optimal innovative capacity and economic value being derived from the assets, by:
     (i) using the computer processor and database for changing at least one of the initial settings;
     (ii) using the computer monitor for viewing the displayed measure over time to learn if the at least one changed setting has positively impacted the measure;
     (iii) and if there is a positive impact on the measure, using the computer processor for maintaining the at least one changed setting, and if not, returning the at least one changed setting to its initial setting.

8. The computer system according to claim 7 wherein the computing system comprises a computer processor and database, further configured to:
   (a) utilize the computer processor and database to repeat the process for the high priority performance measures and the plurality of successive measures to determine further settings;

(b) utilize the computer processor and database to compare the further settings to the current settings to determine any differences between the current settings and the further settings;

(c) and utilize the computer processor and database to change the current settings to the further settings if there are positive differences.

9. The computer system according to claim 6, wherein the computer system comprises a process control system within the computer processor.

10. A method of determining innovative capacity of research and development supply chains for individual public and/or private entities as well as aggregates of public, private, and/or public/private entities that have interdependency links among them and where one article is transformed to the next new article in the supply chain, the method involving a computer system comprising a computer processor and a database for calculating innovative capacity and economic value generated from policy operations performed on a set of assets over a period of time as those operations change, the method comprising:

(a) a computing system comprising a computer processor and a database for collecting and storing operational performance data about the assets in a set as policy operations are performed on the assets according to a model of the transformation method where each successive linked step yields an output article approximately 50% the magnitude of the previous article using data to quantify the yield for each article in the supply chain provided by the Association of University Technology Managers and/or the National Science Foundation of the United States of America;

(b) a computing system comprising a computer processor and a database for calculating and storing, innovative capacity and economic performance data from the collected operational performance data, where the economic performance data comprise performance measures provided by the Association of University Technology Managers and/or the National Science Foundation of the United States of America;

(c) a computing system comprising a computer processor and a database for determining a benchmark value for each performance measure over the period of time in the university public research and development supply chain using data provided by the Association of University Technology Managers and/or the National Science Foundation of the United States of America; and (d) a computing system comprising a computer processor and a database for determining, for each measure, the difference between the current value of the measure and the benchmark value of the measure in the university public research and development supply chain using data provided by the Association of University Technology Managers and/or the National Science Foundation of the United States of America.

* * * * *